(12) United States Patent
Spikes et al.

(10) Patent No.: US 9,135,578 B2
(45) Date of Patent: Sep. 15, 2015

(54) SECURE TARGETED PERSONAL BUYING/SELLING METHOD AND SYSTEM

(71) Applicant: MoviePass, Inc., New York, NY (US)

(72) Inventors: Stacy Spikes, New York, NY (US); Hamet Watt, New York, NY (US)

(73) Assignee: MOVIEPASS, INC., New York, NY (US)

( * ) Notice: Subject to any disclaimer, the term of this patent is extended or adjusted under 35 U.S.C. 154(b) by 0 days.

(21) Appl. No.: 13/856,332

(22) Filed: Apr. 3, 2013

(65) Prior Publication Data
US 2013/0311212 A1    Nov. 21, 2013

Related U.S. Application Data

(62) Division of application No. 13/654,263, filed on Oct. 17, 2012, now Pat. No. 8,484,133.

(60) Provisional application No. 61/649,013, filed on May 18, 2012.

(51) Int. Cl.
| | |
|---|---|
| *G06Q 10/00* | (2012.01) |
| *G06Q 20/30* | (2012.01) |
| *G06Q 10/02* | (2012.01) |
| *G06Q 20/32* | (2012.01) |
| *G06Q 40/00* | (2012.01) |

(52) U.S. Cl.
CPC ............... *G06Q 10/02* (2013.01); *G06Q 10/00* (2013.01); *G06Q 20/3224* (2013.01); *G06Q 40/00* (2013.01)

(58) Field of Classification Search
CPC ....... G06Q 10/02; G06Q 10/00; G06Q 40/00; G06Q 20/3224
See application file for complete search history.

(56) References Cited

U.S. PATENT DOCUMENTS

| | | |
|---|---|---|
| 7,174,534 B2 | 2/2007 | Chong et al. |
| 2001/0018660 A1 | 8/2001 | Sehr |
| 2002/0077966 A1* | 6/2002 | Harycki et al. ................. 705/38 |
| 2004/0138945 A1* | 7/2004 | Adkins et al. .................. 705/14 |
| 2006/0155706 A1 | 7/2006 | Kalinichenko et al. |
| 2007/0203764 A1* | 8/2007 | Kokubo ........................... 705/5 |

(Continued)

OTHER PUBLICATIONS

Galster, Agent-based Online Event Ticket System. In {Online}. Dated Oct. 25, 2005. Retrieved on Dec. 15, 2012. Retrieved from the Internet at URL: www2.enel.ucalgary.ca/People/far/Lectures/SENG697/PDF/projects/2005/P05_Oniline_event-ticket-system.pdf.

(Continued)

*Primary Examiner* — Kevin Flynn
(74) *Attorney, Agent, or Firm* — Courtney IP Law; Barbara B. Courtney

(57) ABSTRACT

Embodiments described herein include a buying and selling method including receiving a request from a user to book a ticket for an event, determining a time for the event and a venue for the event, detecting when the user is at the venue for the event, and in response, electronically funding a user account with an amount sufficient to buy a ticket for the event. The user is notified that funds are available for the ticket. Embodiments further include, after the end of the event, detecting whether the funds were redeemed and determining whether there is a balance remaining over the funded amount. If the funds were redeemed by the user before the event, event data is collected, including a time of the event, a type of the event, a name of the event, and a location of the venue. The event data is associated with user data.

10 Claims, 44 Drawing Sheets

(56) References Cited

U.S. PATENT DOCUMENTS

| | | | |
|---|---|---|---|
| 2007/0276707 A1* | 11/2007 | Collopy et al. | 705/5 |
| 2008/0071587 A1* | 3/2008 | Granucci et al. | 705/5 |
| 2008/0097851 A1* | 4/2008 | Bemmel et al. | 705/14 |
| 2009/0063206 A1 | 3/2009 | Payne et al. | |
| 2009/0119168 A1* | 5/2009 | Otto et al. | 705/14 |
| 2010/0113072 A1 | 5/2010 | Gibson et al. | |
| 2011/0145049 A1 | 6/2011 | Hertel et al. | |
| 2011/0246328 A1 | 10/2011 | Dunwoody et al. | |
| 2011/0313874 A1 | 12/2011 | Hardie et al. | |
| 2012/0078667 A1* | 3/2012 | Denker et al. | 705/5 |
| 2012/0101887 A1 | 4/2012 | Harvey et al. | |
| 2012/0150743 A1* | 6/2012 | Isaacson et al. | 705/44 |

OTHER PUBLICATIONS

PCT/US2012/060863—Jan. 7, 2013—International Search Authority—PCT—International Search Report and Written Opinion of ISA. (PCT/ISA/234) International Preliminary Report on Patentability—PCT/US2012/060863—International Filing Date Oct. 18, 2012—Applicant: MOVIEPASS Inc.

* cited by examiner

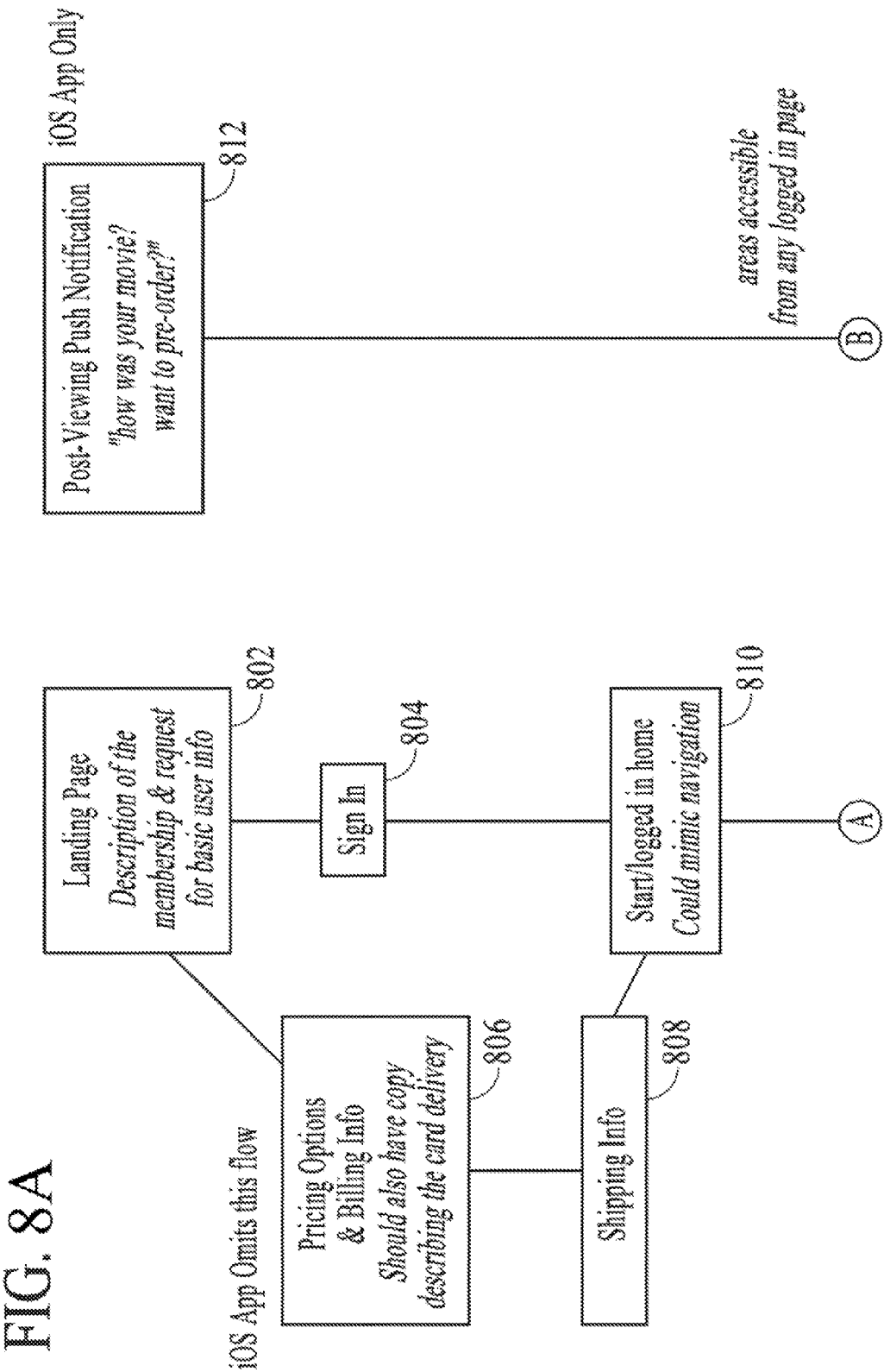

FIG. 18

SECURE TARGETED PERSONAL BUYING/SELLING METHOD AND SYSTEM

RELATED APPLICATIONS

This application is a division of U.S. patent application Ser. No. 13/654,263, filed Oct. 17, 2012, which in turn claims the benefit of U.S. Provisional Patent Application No. 61/649,013 filed May 18, 2012. Patent application Ser. Nos. 13/654,263, and 61/649,013 are entirely incorporated by reference herein.

BACKGROUND

Electronic transactions of all kinds have become more common all over the world. Buyers of goods and services of all types have increasingly come to expect a convenient online way to do business. Sellers also find it convenient to do business electronically, but at the same time wish to be able to maintain an appropriate level of control over marketing, quality, sales data collection, and so on. As an example, sellers of a particular type of good or service often wish to offer a predetermined amount of goods or services to consumers in exchange for a certain fee. In some instances the good might be any food or drink offered at a particular store, and the consumer purchases a plastic card for any amount of money the consumer wishes to place on the card. The card can be used by anyone carrying it to the particular store until the amount of money is exhausted. This works well for completely pre-paid goods and services. The seller has already received value for the yet-to-be collected goods or services. In some instances, the card funds might not ever be exhausted. These kinds of cards are often given as gifts that may be partially used, or might never be used. In this example, it does not matter who has or uses the card. And if the card is lost or stolen, the risk is borne by the buyer. No identity verification or card tracking is necessary. This type of pre-paid card has some advantages for the merchant. The buyer is motivated to visit the store, for example. Also, the buyer pays up front and may never redeem all of the value paid for. On the other hand, because the card acts just like cash, the seller cannot collect useful data on the consumer who bought the card and the consumer who uses the card. This data includes demographic and geographic data, which products are purchased, when products are purchased, etc.

Another way to market and sell goods and services is to offer a predetermined quantity of goods or services on pre-paid subscription basis where the goods and services must be consumed within a period of time and/or by a specific person. For example, Cineworld cinemas in the UK offer a one month movie pass for a fixed fee. The pass permits the buyer to view unlimited movies only at Cineworld theaters during that month. Similarly, Cineworld gift cards may be purchased for giving to another person. These cards have some limitations, however. For example, once the card is issued, the user's identity must be established each time the card is used to try to prevent a buyer from loaning the card to other people. From the buyer's perspective, the card is limited in that it can only be used in theaters owned by Cineworld.

BRIEF DESCRIPTION OF THE DRAWINGS

FIGS. 8A and 8B make up a block diagram illustrating an overview of a mobile user interface according to an embodiment.

FIGS. 9-41 are representations of screens from a mobile application according to an embodiment.

DETAILED DESCRIPTION

Embodiments of a method and system for secure targeted personal buying/selling of goods and/or services are described. Theater tickets will be used as an example of the good being sold. However, the invention is not limited to any particular good or service. Further, the example is of a subscription-type offer, but the invention is broader than that. The movie industry provides an instructive example of some advantages of the invention. For example, various theater chains may not wish to honor pre-paid coupons sold by a third party because the theater chains might prefer to use their own programs for coupons that entice buyers with discounts or other offers. Yet, moviegoers would benefit from a plan that allows them to pre-pay for movies at any theater of their choice in such a way that the avid movie-goer can save a substantial amount of money on ticket purchases. Also, as will be described further below, embodiments of the invention enable the collection of extremely detailed data regarding buyer behavior, all tied to an individual buyer whose personal information is known. This data is useful for theater owners, in this example, but is potentially very useful to any seller offering a specific type of good or service. In addition, any subscription or similar plan that increases attendance at theaters is beneficial for theater owners.

As described below, in another aspect of the invention, the location-based nature of the method and apparatus enables highly targeted offers to the consumer for goods or services related to the good or service already purchased.

Figure 1:
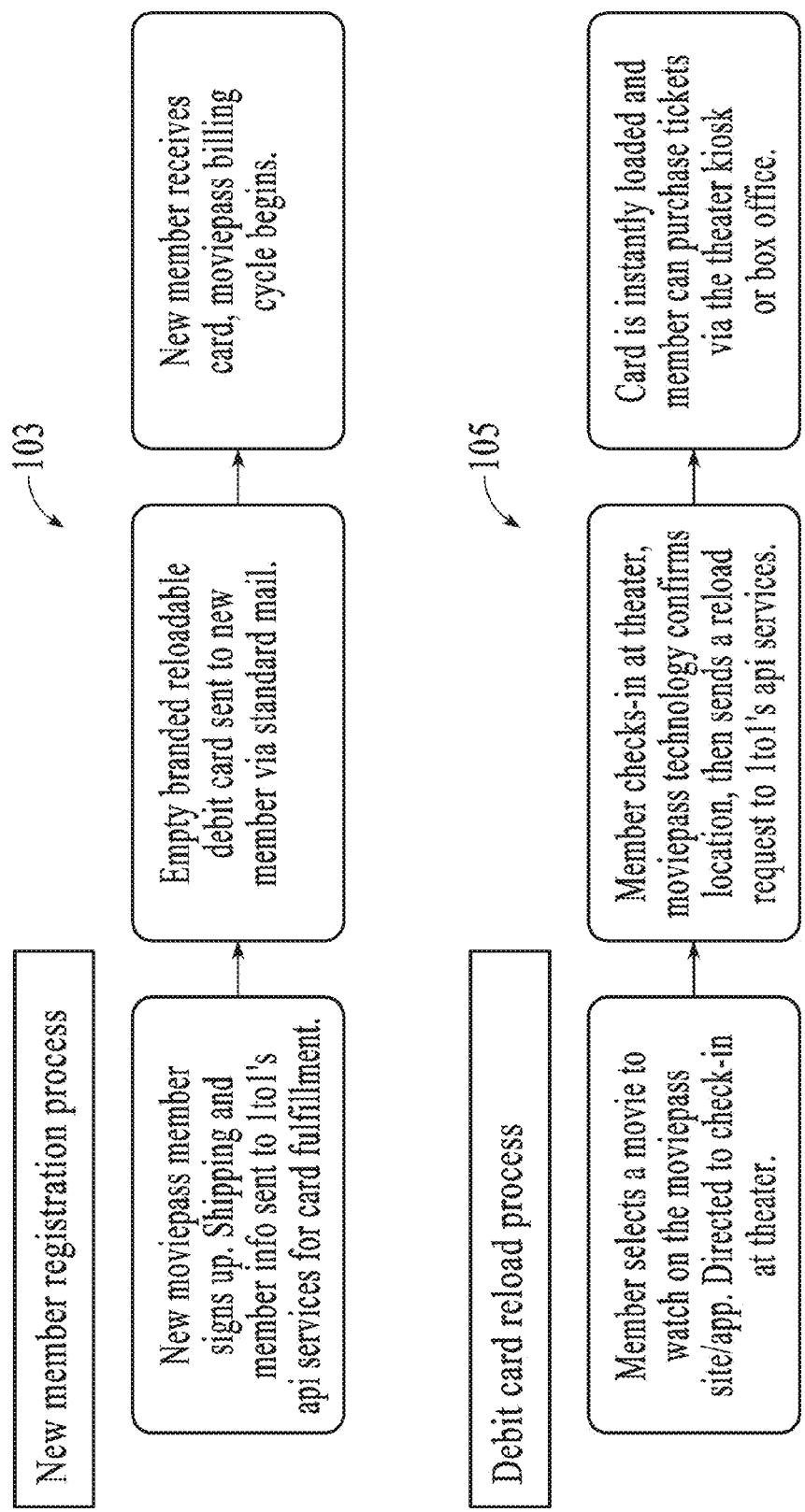
FIG. 1 is a flow chart illustrating an overview of a secure targeted personal buying/selling method according to an embodiment.

FIG. 1 is a flow chart illustrating an overview of one embodiment. For purposes of describing the invention, a MoviePass™ service will be used as an example throughout this document. However, the MoviePass™ service is just one example of how the invention can be embodied. The MoviePass™ service will also be referred to as "the service" herein. The service allows a user to register for a membership, or subscription. In this document, a member and a subscriber are the same person, but in general "membership" relates to the use of the service, and "subscription" relates to the purchase of the service. The memberships are for various periods of time, for example, one month, three months, and one year. The pricing is further dependent on the geographic region of the user, in order to reflect movie ticket prices in the area. In one embodiment, after the user successfully registers and pays for a membership, he or she is now a member and receives a reloadable membership card in the mail. For purposes of describing examples in this document, the term member and user are interchangeable, even though a member is a person who has successfully registered for the Movie- Pass™ service, while a user might not be. The reloadable, pre-paid card is known in the art and is supplied by many banks and credit card companies, such as VISA™, MasterCard™, AMEX™, Discover™, and more. Registration typically takes place online with the use of a personal computer (PC) or through a mobile application (app) used on a smartphone or other smart hand-held device. Registration can also take place via phone. With reference to FIG. 1, a new member registration process 103 is shown. A new member signs up for the service, including entering their shipping information. In an embodiment, the shipping information is sent to a third party credit card provider, e.g., 1 to 1. The credit card provider generates a reloadable debit card and mails it to the new member. When the new member receives the card, the billing cycle can begin.

Once the membership card is in hand, the member can book a movie online using the web site of the service on a PC, or the service app on a smart device. At this point, the card has no funds on it. As shown in the debit card reload process 105, the member selects a movie to watch on either the MoviePass™ website or mobile application (app). The member is then directed to check-in at the chosen theater. When the member is at the theater and checks in using the mobile app, MoviePass™ confirms the location of the member. This verifies: 1) that the member is at the correct theater at the correct time for the booked movie; and 2) that the person checking in is indeed the member. The identity of the member is verified to a high degree of certainty based on study results that show the likelihood of a mobile phone owner to loan the phone to another for several hours is extremely low. According to this aspect of the invention, while a person might loan their membership card to another person, the card cannot be used unless the phone is present with the card at the theater at the time of the ticket purchase. This reduces the possibility of "membership sharing" to a minimum. In an embodiment, the location is verified using the global positioning system (GPS) capabilities of the mobile device. In alternate embodiments, a third party location service can be used instead of the member's own device. Once the member's location is verified as being the location of the selected theater, MoviePass™ requests the credit card service to place funds on the card. The card is instantly loaded and the member can then purchase the theater ticket at the theater kiosk or box office.

Figure 2:
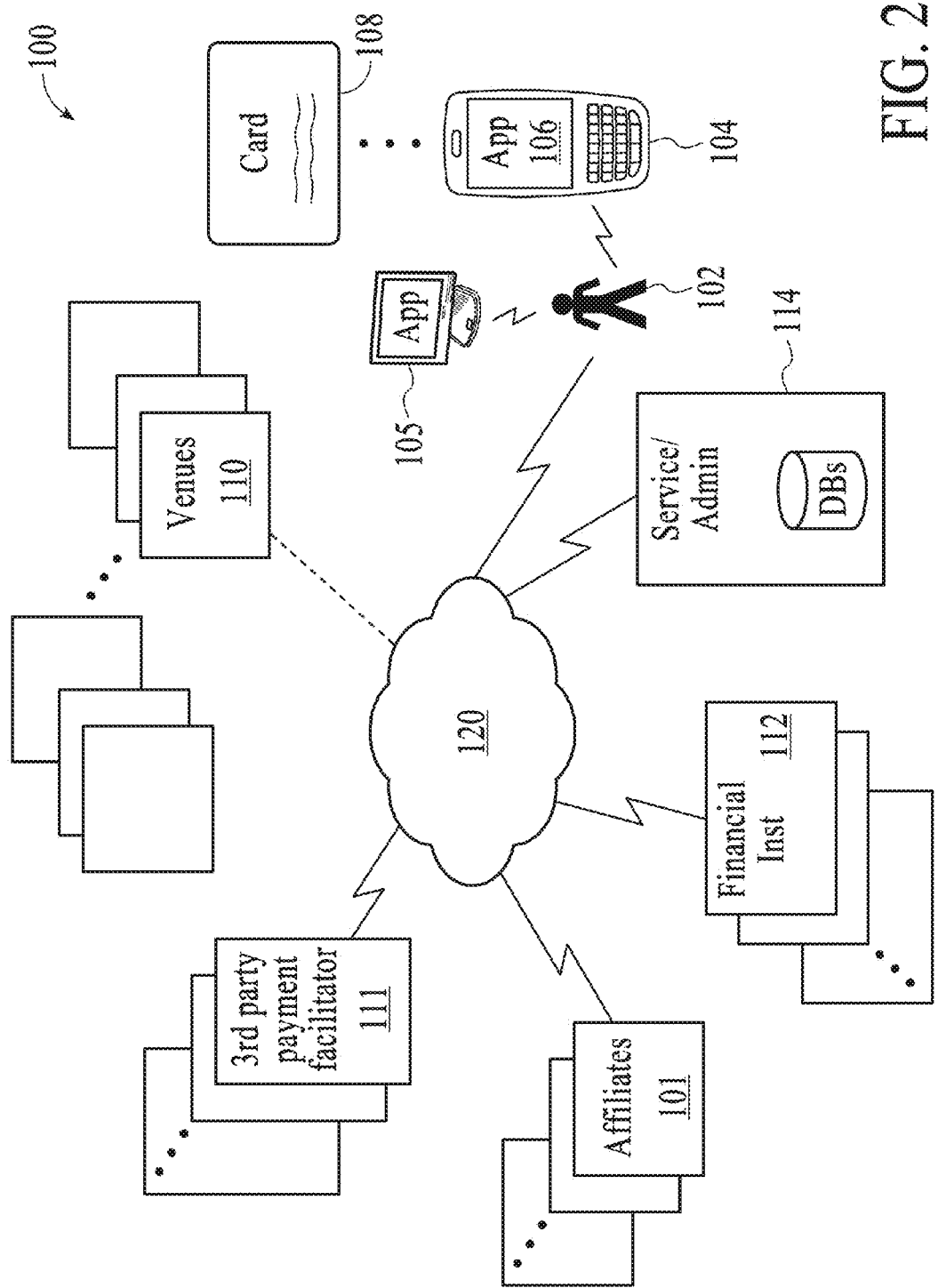
FIG. 2 is a block diagram of a secure targeted personal buying/selling system according to an embodiment

FIG. 2 is a block diagram of a secure targeted personal buying/selling system 100 according to an embodiment. A user 102 of the system (also referred to herein as a member or MoviePass™ member) accesses a user interface of the system 100 using either a personal computer (PC) 105 or a mobile device 104 with a system mobile app 106. The user holds a reloadable debit card 108 in an embodiment, as described further below. The card 108 is also referred to herein as a MoviePass™ card, and it is intended to be used exclusively for purchasing theater tickets according to the example followed herein. A service and administration entity 114 for the system includes processors and databases to perform the methods described herein. While the service and administration entity 114 is shown as a single element communicating with the Internet 120, the entity 114 in most embodiments is distributed over the network in any number of physical locations.

The entity 114 communicates with at least one third-party payment facilitator 111 via the Internet 120. Payment facilitators 111 include credit or debit card providers and servicers (such as 1 to 1 in one example), and billing service providers that perform invoicing and related function for the MoviePass™ entity. Various financial institutions 112 communicate with one or more of the payment facilitators 111 and the entity 114 to perform "banking" functions as required to fund reloadable cards, receive member payments, and so on. Venues 110 in an embodiment are multiple theaters that the MoviePass™ member can patronize. These include any theaters in the United States. In other embodiments, venues 110 can be other types of businesses from which member can buy goods or services according to the methods described herein. Venues 110 need not be able to communicate via the Internet 120 in order to participate in the methods described. However, in various embodiments, some of the venues can communicate via the Internet 110 to process ticket orders or payments, for example.

In an embodiment, various membership pricing plans are available, and there are multiple methods of assigning pricing plans. A typical membership is on a monthly basis. However, in an embodiment, different periods of membership are available, if the member wishes to pay for three months or for one year. The longer membership periods are a better deal for the consumer, as they cost less per day (which means less paid per movie if one movie is watched per day). A monthly fee is charged for an unlimited number of movies, but only one movie can be viewed per day, and only one viewing of any one movie is allowed. Plan pricing is partially based on the user's geographic region because theater prices are known to vary predictably by region. In an embodiment there are levels of plans within each of the geographic regions. For example, a basic level plan includes 30 movies/month, Monday-Thursday (no weekends), and 2D movies only. A next level plan includes 2D movies only, but anytime. A deluxe plan includes 2D, 3D and IMAX movies anytime. For any plan one movie can be seen per day, and the same movie cannot be seen twice. All of the plan pricing methods are examples, and are not meant be exclusive. Many variations are possible.

Various strategies are possible for arriving at a plan price that is appropriate for a region. For example, the price can be determined based on consumer reaction to different price offerings. As another example, affiliates may supply the names of prospective members about whom information is known that will indicate that some of these people will willing to pay more or less for a plan. In yet another example, the information about prospective members can indicate that some of them are potentially more valuable because they would attract additional members, and thus should be enticed by a relatively lower price for a plan.

Figure 3:
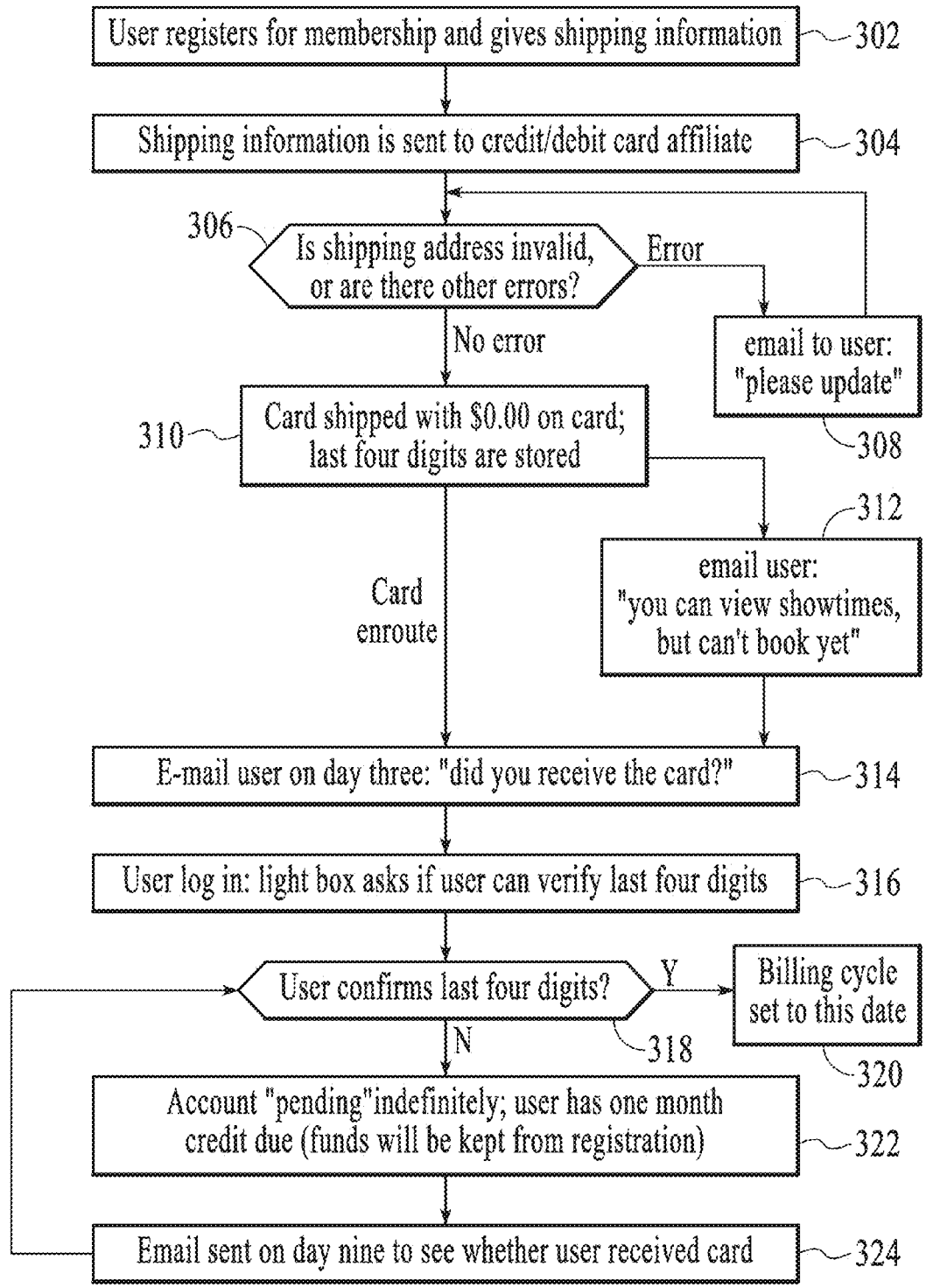
FIG. 3 is a flow diagram of a user registration process according to an embodiment.

FIG. 3 is a flow diagram of a process 300, which is the member registration process 103 in greater detail. A user registers for membership at 302 using a PC or mobile device to access the MoviePass™ system. As part of the registration process, the prospective member provides their shipping information. The shipping information is sent by MoviePass™ to the card provider (in this example, the provider is 1 to 1) at 304. At 306, the card provider determines whether there are any errors in the information provided, including the shipping address. If there are errors, the user (prospective member) is sent an email asking for corrected or updated information at 308. If there are no errors, with reference to 310, a reloadable debit card is generated and mailed to the shipping address. The card has no money loaded on it at this point. The last four digits of the card are retained and stored as a unique identifier. While the card is enroute, the user is notified by email that they can only view showtimes currently, but will be able to book movie showings when the card arrives. The user can also be notified that their billing period will start when the card arrives and is activated.

The user is sent an email three days after the card was generated, as shown at 314. This email asks the user whether they have received the card. At 316, the user can log in to the MoviePass™ site, verify that they have received the card, and verify that the last four digits of the card number. At 318, the system checks the verification of the last four digits. If the card is correctly verified, the billing cycle for the plan selected by the user (as further described below) is set to start at the current date, as shown at 320. If the card verification is not successful (322), the account is placed into a "pending" status. On the ninth day, as shown at 324, another email is sent to check whether the user has received the card. Sending the inquiry email and checking for confirmation of receipt continues until the receipt of the card is correctly verified.

In some embodiments, offers for trial memberships are handled manually by customer service (CS) personnel. Cancellations can also be handled manually. In an embodiment, the MoviePass™ entity includes online administration tools that allow CS personnel to look up various data related to a particular member, such as total movies redeemed, the movie theater for each movie, and the ticket price. The total cost of redemptions is also available, where redemption means a member using the MoviePass™ card to purchase something. The number of days the member has on his or her plan is also available. CS personnel can use the administration tools to cancel a member's account, to confirm the last four digits of a member's card to be refunded, and to create a refund of any amount.

If a member loses his card, he can contact CS through the MoviePass™ user interface or by phone, and CS uses the administration tools to order a new card. Typically, the new card will have the same number and attributes as stored in the system for the previous card.

Figure 4A:
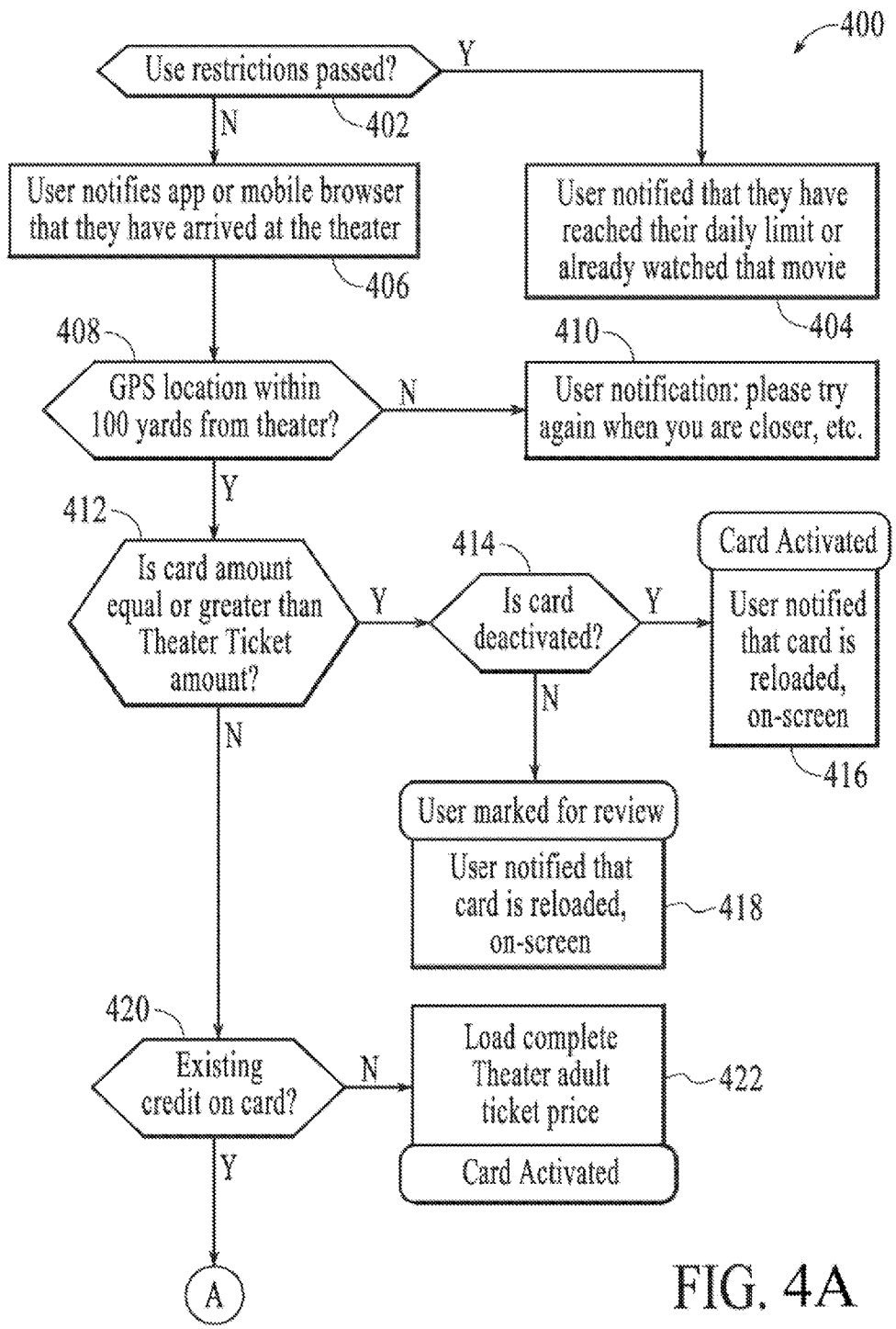
FIGS. 4A and 4B make up a flow diagram of a user redemption process according to an embodiment.
Figure 4B:
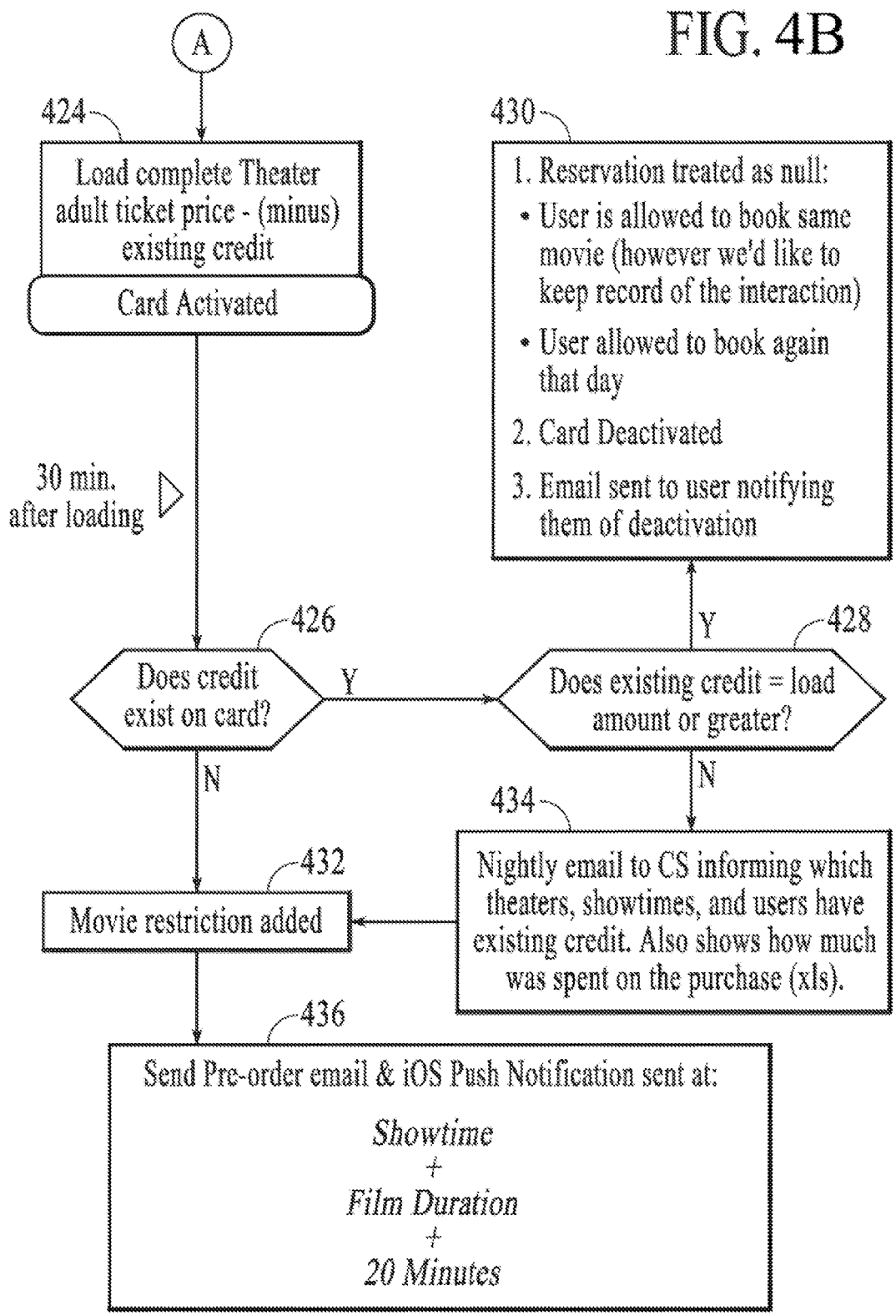

FIG. 4 is a flow diagram of a user redemption process 400 according to an embodiment. After a user has selected a movie using the MoviePass™ user interface, the system determines (402) whether the user passes the restrictions of one movie per day and one viewing of each movie. If the user does not pass the restrictions, an appropriate message is displayed at 404 to let the user know that they have reached their daily limit, or that their card has already been used to redeem a ticket for the selected movie. If the user passes the restrictions, the user proceeds to the theater, once at the theater the user notifies the app or mobile browser that they have arrived (406). The system determines at 408 whether the user is within a predetermined distance of the theater using the GPS capability if the user's mobile device. In an embodiment, the distance is 100 yards, but the distance could be greater or less. In other embodiments a third-party location system (such as Locaid™, for example) can be used instead of the GPS capability of the mobile device. If the user is not within the predefined distance (410), the user is notified by the system that he should try to check in again when he is closer to the theater. If the user checks in successfully, the system then determines at 412 whether the amount of money on the card is equal to or great than the theater ticket amount. The theater ticket amount is preset as further described below, and applies as soon as the user selects a movie for viewing at a particular theater. If the amount of money on the card is equal to or greater than the ticket price, the system then checks at 414 to see whether the card is presently deactivated. If the card is deactivated, the card is activated and the user is notified through the MoviePass™ user interface that the card is reloaded (416). If the card is not deactivated at 414, the system marks the user for review at 418 to determine why the card was not previously deactivated. Also, the user is notified through the MoviePass™ user interface that the card is reloaded.

Referring again to 412, if the amount on the card is not equal to or greater than the ticket price, it is determined at 420 whether there is any existing credit (amount) on the card. If there is no credit on the card, the theater ticket price is loaded onto the card and the card is activated at 422. If there is existing credit on the card, then the card is loaded with the price of the ticket minus the existing credit on the card at 424.

Various events take place thirty minutes after the card has been loaded. The card is checked again at 426 to determine is any credit exists on it. If credit does exist, at 428, the system determines whether the amount of credit equals the amount that was last loaded or is greater than the amount last loaded. If the existing credit is equal to or greater than the load amount, the following events take place as shown at 430: 1) the last selection of a movie ("reservation") is treated as null and the user is allowed to book the same movie again. However, a record of the transaction is kept for research purposes; 2) the card is deactivated; and 3) an email is sent to the user to notify them of the deactivation. The typical circumstance that causes 428 to be true is that the user did not redeem the amount loaded on the card within the thirty minutes. Therefore, the user should be allowed to reserve the same movie again.

If credit on the card is not equal to or greater than the ticket amount at 428, then an automatic nightly email is sent to CS at 434 informing them which theaters, showtimes and users have existing credit. CS is also informed of how much was spent on the purchase for the particular redemption. Once the information has been sent to CS at 434, a restriction of the particular movie is added to the user's account at 432. This restriction is also placed if it is determined at 426 that no credit exists on the card after thirty minutes. After the movie restriction is added, it is assumed the movie has been watched, and the user is sent a pre-order email and also an iOS push (for iPhone users) at 436, each notifying the user of opportunities to purchase products related to the movie. These notifications are sent, in one embodiment, at show time plus film duration time plus twenty minutes. This timing is arbitrary and could be changed to any other time.

Figure 5:
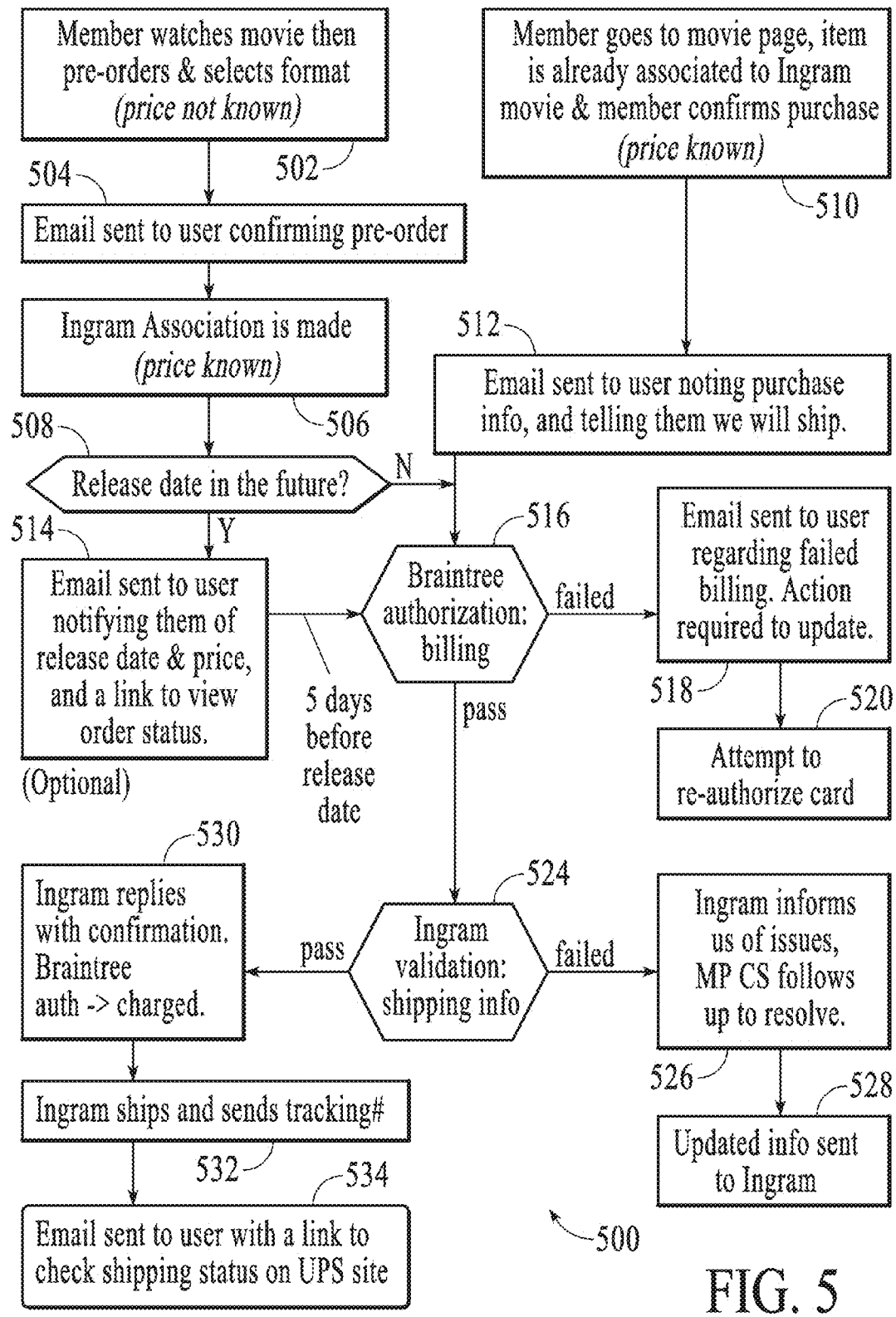
FIG. 5 is a flow chart illustrating user merchandise order processes according to an embodiment.

FIG. 5 is a flow chart illustrating order processes 500 according to an embodiment. After the user or member has watched a movie, they might be interested in purchasing the movie, or merchandise related to the movie. According to embodiments, the user is automatically sent offers to order items, or pre-order items that are not available yet. For example, at 502 the member watches the movie, and then pre-orders the movie in one or more formats (for example DVD or UltraViolet).

At this point the price may not be known to the system. The system sends an email to the user confirming the pre-order at 504. In one embodiment, a fulfillment affiliate or partner, Ingram, is used to ship actual merchandise to members. All companies have varying inventory marking and management methods and protocols. Because the MoviePass™ system does not use the same methodology as its fulfillment partner, an association must be made between (for example) the tag that refers to a particular movie in the MoviePass™ system and the corresponding tag in the partner system. This association takes place at 506, and the price of the merchandise is then known to the MoviePass™ system. If, as determined at 508, the release date is in the future, the user is sent an email at 514 notifying them of the release date and price, with a link to the status of their order. If the release date is not in the future, the flow joins the order flow, which handles items that are currently available.

Referring to 510, a member goes to a movie page using the MoviePass™ user interface. Because the item is available, the MoviePass™ information or tag is already associated with the fulfillments partner's information or tag. The member confirms the purchase. An email is then sent to the member at 512 noting the purchase information and projected shipping time. At 516, a billing service affiliate or partner handles billing authorization on behalf of the MoviePass™ system. In one example, such a partner is Braintree, but there are others. In the case of pre-ordering, the billing partner authorization takes place five days before the release date of the movie for purchase.

If the billing authorization fails, the user receives an email regarding the failed billing at 518, and in most cases a required action is identified, such as providing corrected or updated information. Once the user communicates corrected or updated information, an attempt is made at 520 to re-authorize the payment card. If the billing authorization is successful, the fulfillment partner validates the shipping information at 524. If the validation fails, the fulfillment partner informs the MoviePass™ system of the issues, and CS follows up at 526 to resolve the issues. In some instances, the issues are recurring and the fixes are known, and in such instances the resolution can be automated as well. At 528, any updated information required by the issue is sent to the fulfillment partner.

If the validation at 524 was successful, the fulfillment partner replies with a confirmation and the billing partner authorizes the card to be charged for the required amount at 530. At 532 the fulfillment partner sends package tracking information to the MoviePass™ system. At 534, the MoviePass™ system sends an email to the user with a link to check the shipping status, for example on the United Parcel Service (UPS) web site. Other parcel services could be used as well.

Another action (not shown) that takes place after the movie, according to another embodiment, is solicitation of member feedback on the movie. Because the service knows the run time of the viewed movie (and also knows the run time of trailers), at the end of the movie, the service can send the member a message asking for their review.

Another opportunity to collect member feedback occurs before the booked movie is scheduled to start. For example, the member can be offered a trailer viewing and/or asked to review the trailer. The member can be asked where they heard about the movie, and so on.

Figure 6A:
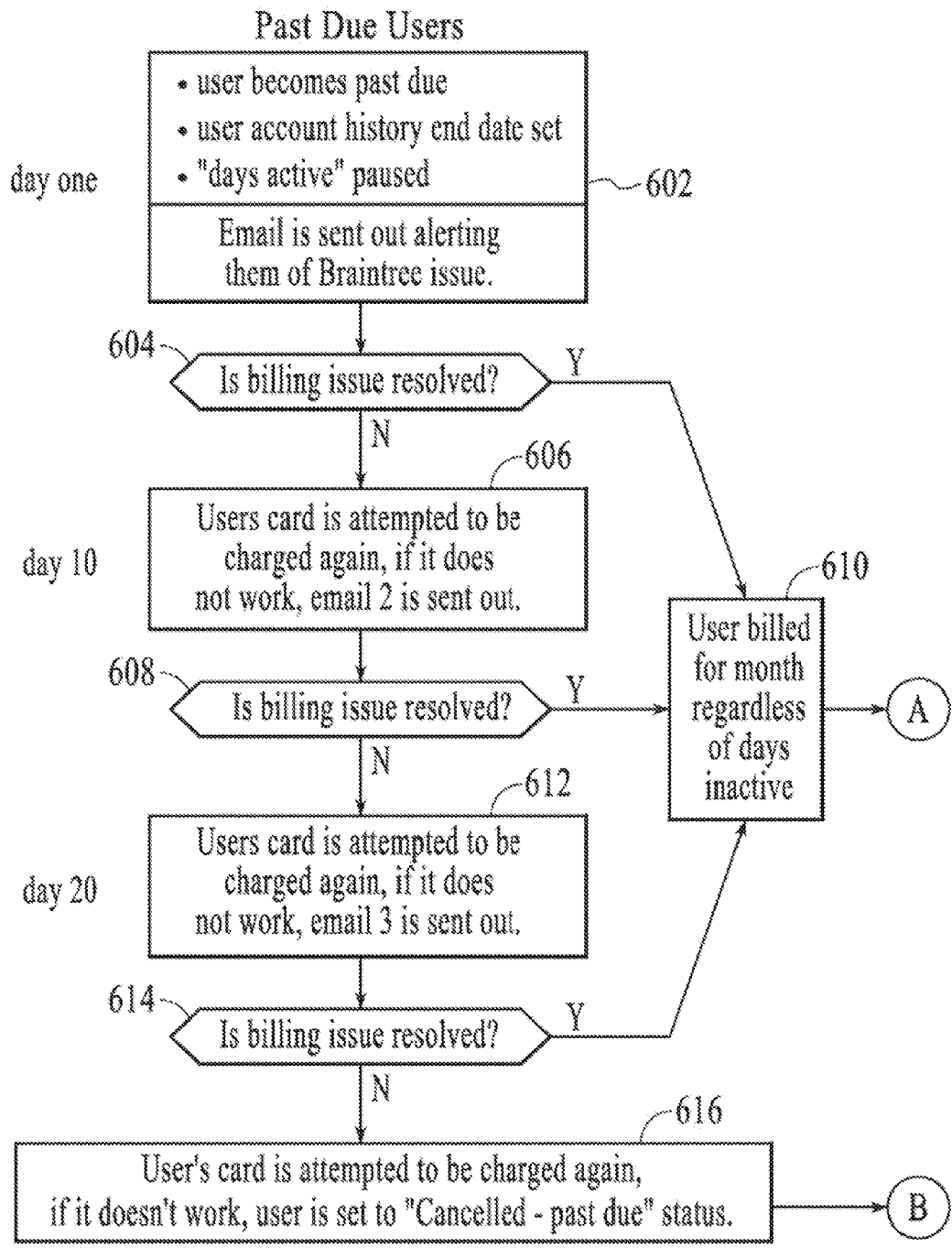
FIGS. 6A and 6B make up a flow diagram illustrating various actions for past due accounts, cancelled members, and former members wishing to be reinstated, according to an embodiment.
Figure 6B:
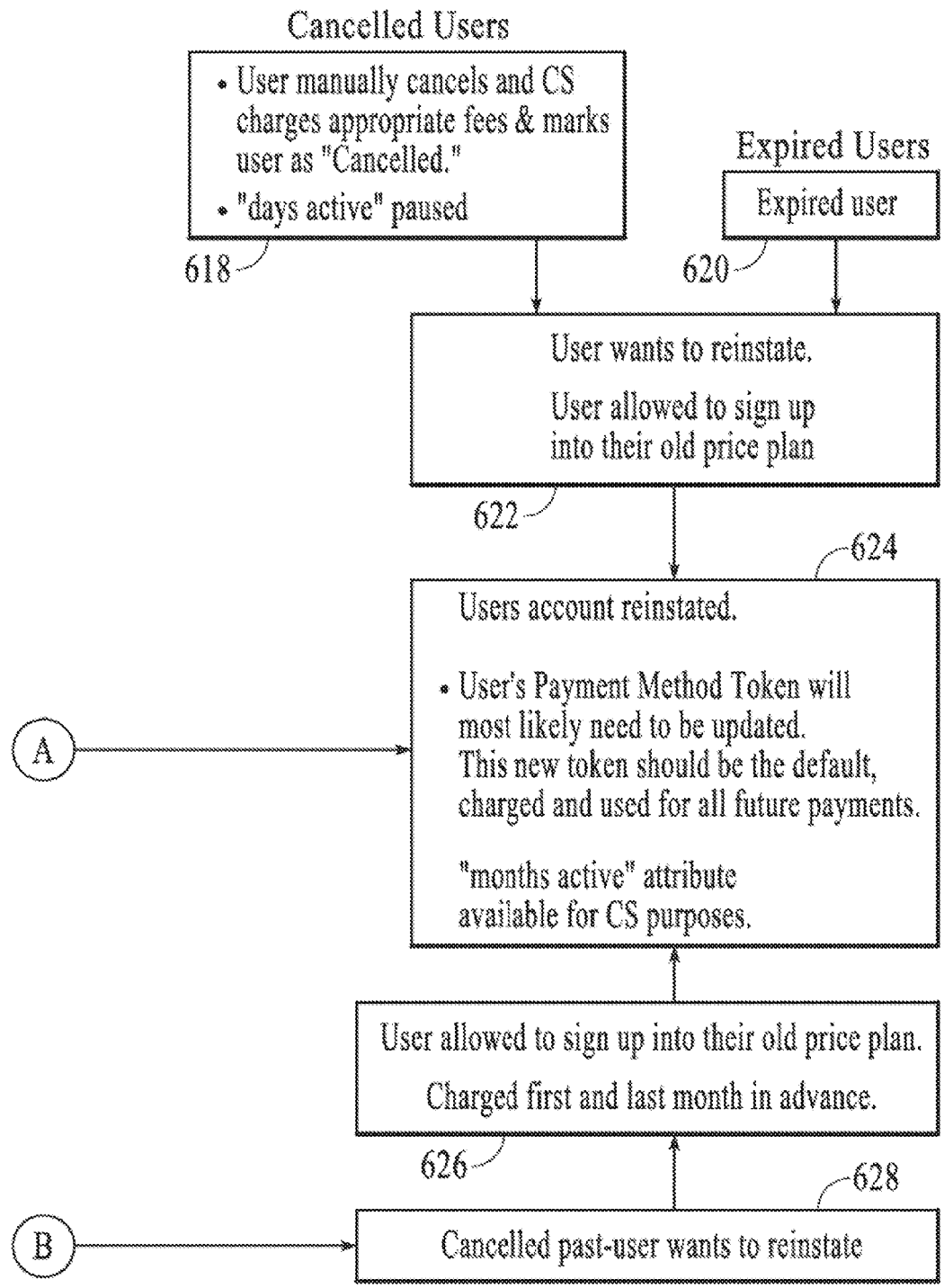

FIG. 6 is a flow diagram illustrating various actions 600 for past due accounts, cancelled members, and former members wishing to be reinstated. On the left of the diagram at 602, various things occur on the first day a user becomes past due. A user account history end date is set, and a "days active" counter is paused. An email is also sent to the user alerting them of the issue as reported to the MoviePass™ system by the billing partner. The MoviePass™ system checks to see if the issue was resolved at 604. If the issue was not resolved, the user's card is attempted to be charged again at day ten, and if it does not work, a second email is sent to the user at 606. Another check to see if the issue was resolved is carried out at 608. If the issue is still not resolved, another attempt to charge the user's card is made at day twenty, and if it does not work (612) a third email is sent to the user. Once again a check for resolution of the issue is made at 614. If the issue is not now resolved, one more attempt to use the card is made, and is it fails the user is set to "cancelled-past due" status at 616.

If the billing issue is resolved at 604, 608, or 614, the user is billed for the month regardless of days the card was inactive (610). At 624, the user's account is reinstated. Most likely, the user's payment token (card) will need to be updated, and the new token becomes the default for future payments. In an embodiment, a "months active" attribute is available for CS purposes. The "days active" also accurately accounts for this. Referring to the far top right of the diagram, at 620 expired users can choose to reinstate (622). Similarly, at 618, cancelled users may wish to reinstate (622). For example, a user may manually cancel, causing CS to charge the appropriate fees and mark the user as cancelled. The "days active" counter is paused for the cancelled user. When a user wishes to reinstate (622), they are allowed to sign up into their old price plan. Then the user account is reinstated as in 624. The user may also wish to be reinstated if they are a user cancelled and "past due" as shown in 628. In 626, the user can sign up to their old price plan, but is charged a first and last month in advance before they are reinstated at 624.

Figure 7:
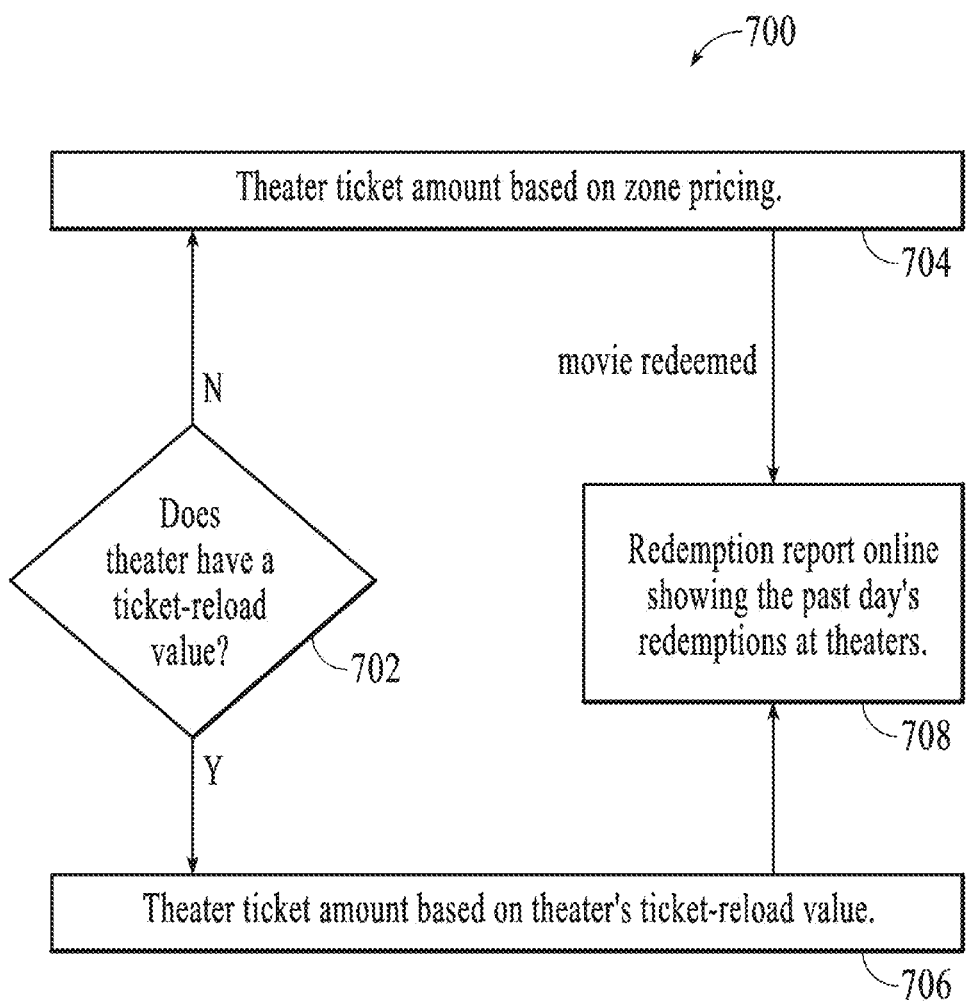
FIG. 7 is a block diagram illustrating a ticket pricing strategy according to an embodiment.

FIG. 7 is a block diagram illustrating ticket pricing strategy 700 according to an embodiment. If the theater does not currently have a ticket reload value as determined at 702, the ticket amount is based on geographic zone pricing. The MoviePass™ system defines geographic zones and prices within those zones. If the theater does have a current ticket reload value, the ticket amount is based on this ticket reload value at 706. When a movie is redeemed with either the amount set in 704 or the amount set in 706, a daily redemption report shows the past days redemptions at theaters. Ticket prices can be adjusted based on information in the redemption reports. The redemption report shows tickets booked using the MoviePass™ system, the theaters, the showtimes, the amounts per ticket transaction, redemption locations, and the movies redeemed. This report is available as one of the administration tools, and an administrator can easily reset a ticket reload value from the administration tool user interface. In addition to the daily redemption report, the following further information is collected in an embodiment: merchant category classification (MCC codes); terminal IDs; and merchant IDs.

An MCC is a four digit numerical code assigned to merchants by card providers such as VISA™ and MasterCard™. The MCC for a transaction can be used to verify that the transaction was at a restaurant or a theater, for example. In an embodiment, use of the card can be restricted to certain MCCs. The card can also be restricted to certain terminal IDs, so that the user can only use the card at the box office of a specific theater, and not at the concession counter. In an embodiment, use of the card for any purchase other than of a movie ticket for a booked movie is a violation of the membership agreement. A variety of reactions to misuse of the card are possible. One, two or three instances of misuse can result in the member being warned, or the card being suspended or canceled.

In yet another aspect of the invention, data that is collected by the service is structured to provide valuable forms of information for use by third parties, including theater owners, movie producers, DVD and book retailers, and more. Because the service has detailed personal information about each member and is able to closely track member behavior, the data collected is much more meaningful than data currently available. Specifically, in the example of the movie theater business, most transactions are cash or credit card transactions that do not identify the buyer in detail. It has been possible to track how many tickets are purchased for a particular movie, and in which theaters, but that is all. According to embodiments of the invention, however, when a purchase is made, the geographic location of the purchase is known as well as the purchaser's age, gender, type of mobile phone, average income in zip code, home address, and purchase history. This allows the collected data to be organized as desired to produce detailed, custom reports. For example, a report can associate male moviegoers of a certain age range with the types of movies most frequently watched, and can indicate the geographic areas and times of day for movie showings. Targeted advertising can then be generated to drive movie traffic to undersold showings that would appeal to the moviegoer who has a history of attending the type of movie at the undersold time of day. The advertising can be sent to the moviegoer's mobile device and can include incentives offered by the theater, such as a food discount.

According to an embodiment, proprietary service software is offered to theaters for free. The software on the theater side can facilitate the ticket buying transaction, and can also allow theaters access to the collected data more directly.

In another aspect of the invention, the service is associated with various social networks, including Facebook™ and Twitter™. The member can use social networks to invite friends to a movie, providing the opportunity to collect information on friends of the member who accept or decline the invitation.

Figure 8B:
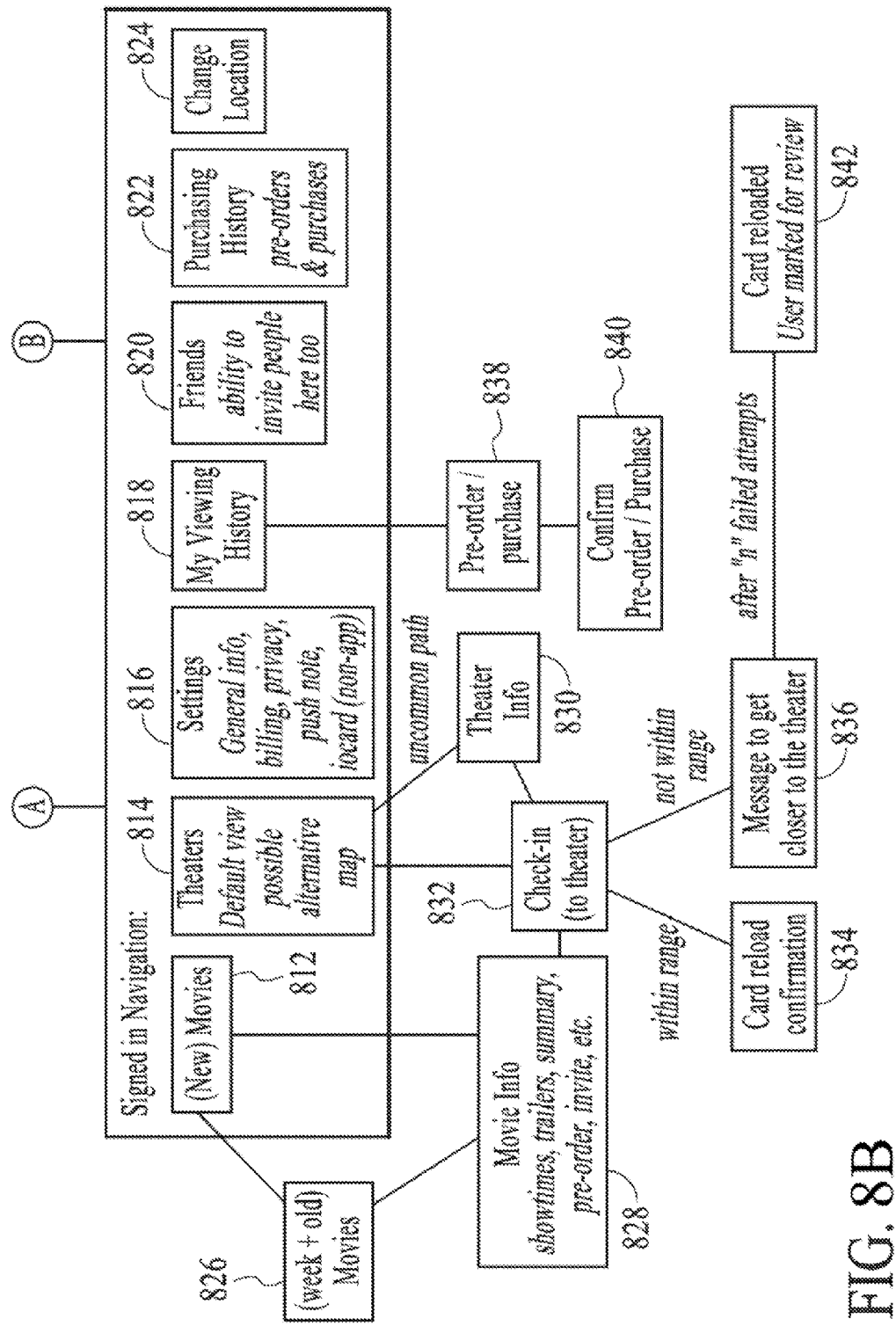

FIG. 8 is a block diagram illustrating an overview of a MoviePass™ mobile user interface 800. There is a landing page 802 that provides a description of membership and requests basic user information. From the landing page, a user who is a member may sign in at 804. Or, from the landing page, billing and pricing information can be viewed at 806, as well as shipping information for the member card. The shipping information page 806 can also viewed either from a home page 810 (once the user is logged in), for example to check on ordered merchandise.

From the home page 810 a set of navigation pages are accessible: (New) Movies page 812; Theater page 814; Settings page 816; My Viewing History page 818; Friends page 820 (from which friends can be invited); Purchasing History page 822; and Change Location page 824. This same set of navigation pages is also accessible from a Post-Viewing Push Notification page 812.

From (New) Movies page 812, (week+old) Movies page 826 and Movie Info page 828 are accessible. Check-in (to theater page 832 is accessible from Theater page 814, Movie Info page 828, and Theater Info page 830. From Check-in page 832 page either a card reload confirmation 834 or a message to get closer to the theater 836 are displayed to the user depending on the user's physical location. If the user receives a predetermined number of messages 836 before check-in is successful, the use is marked for review 842 as described in the redemption process of FIG. 4.

The setting page 816 includes general information, billing information, privacy information, and location-based service information for embodiments in which the GPS of the mobile device is not being used by the MoviePass™ service. From the My Viewing History page 818, a Pre-order/Purchase page 840 is accessible, and in turn, a Confirm Pre-order/Purchase page 840. The purchasing History page 822 shows pre-orders and purchases.

FIGS. 9-41 are mobile device screenshots of a MoviePass™ mobile application according to an embodiment.

Figure 9:
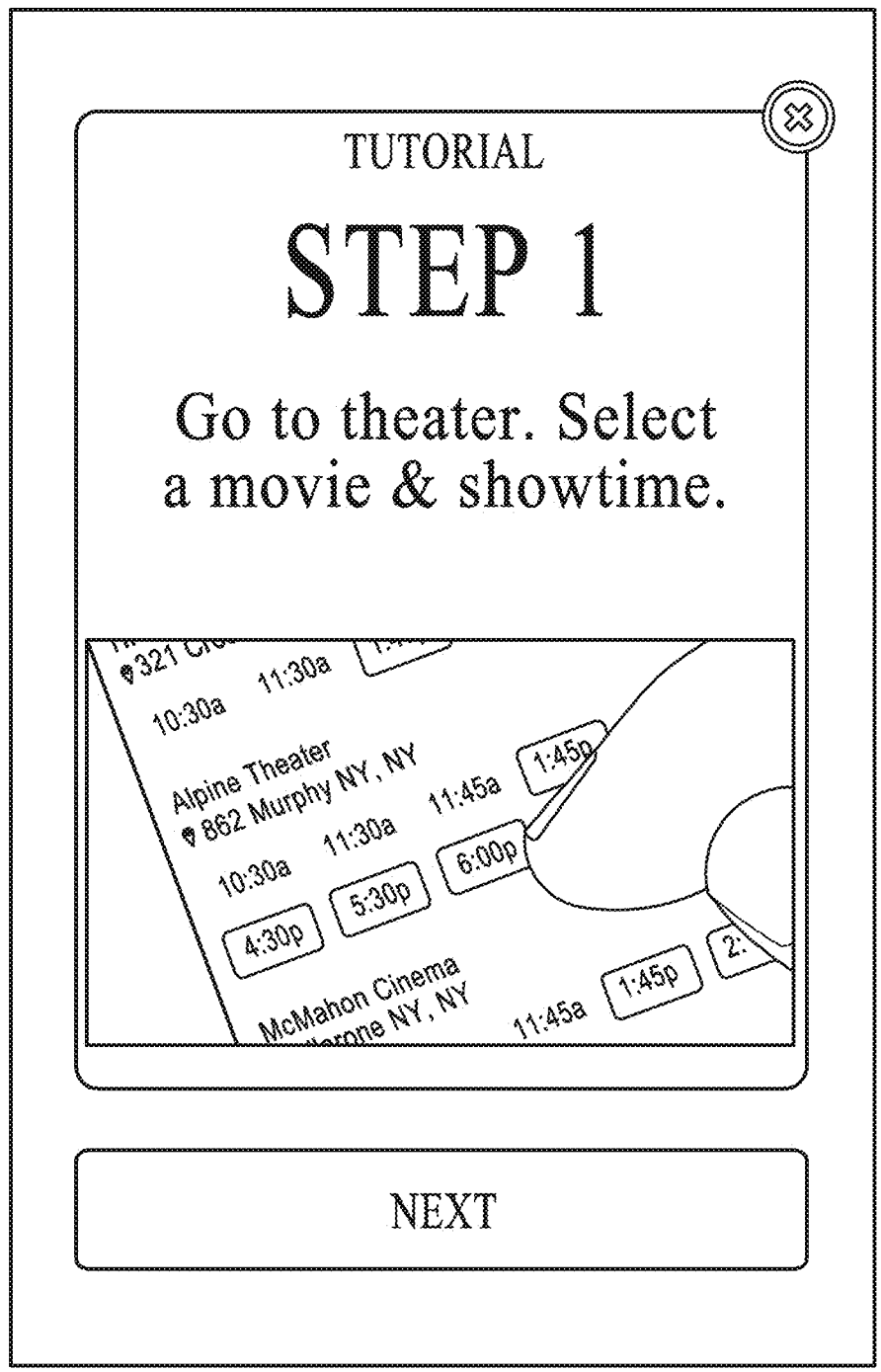

FIG. 9 is a screenshot of step one of the MoviePass™ mobile application user tutorial. It demonstrates the process of how to use the MoviePass™ card once it is received by the user and activated.

Figure 10:
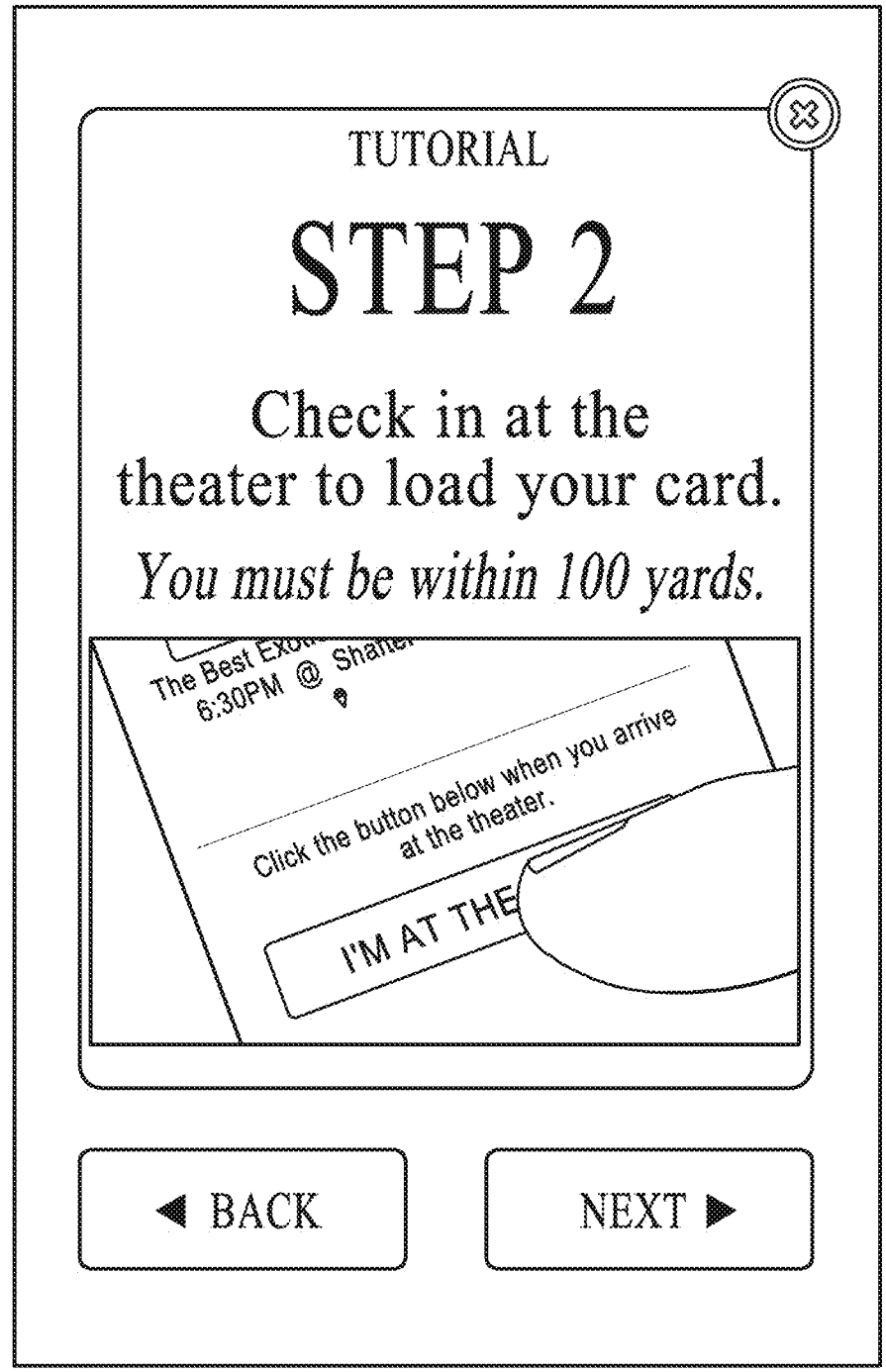

FIG. 10 is a screenshot of step two of the MoviePass™ mobile application user tutorial. It demonstrates the check in process, and the card loading requirement of being close to the theater.

Figure 11:
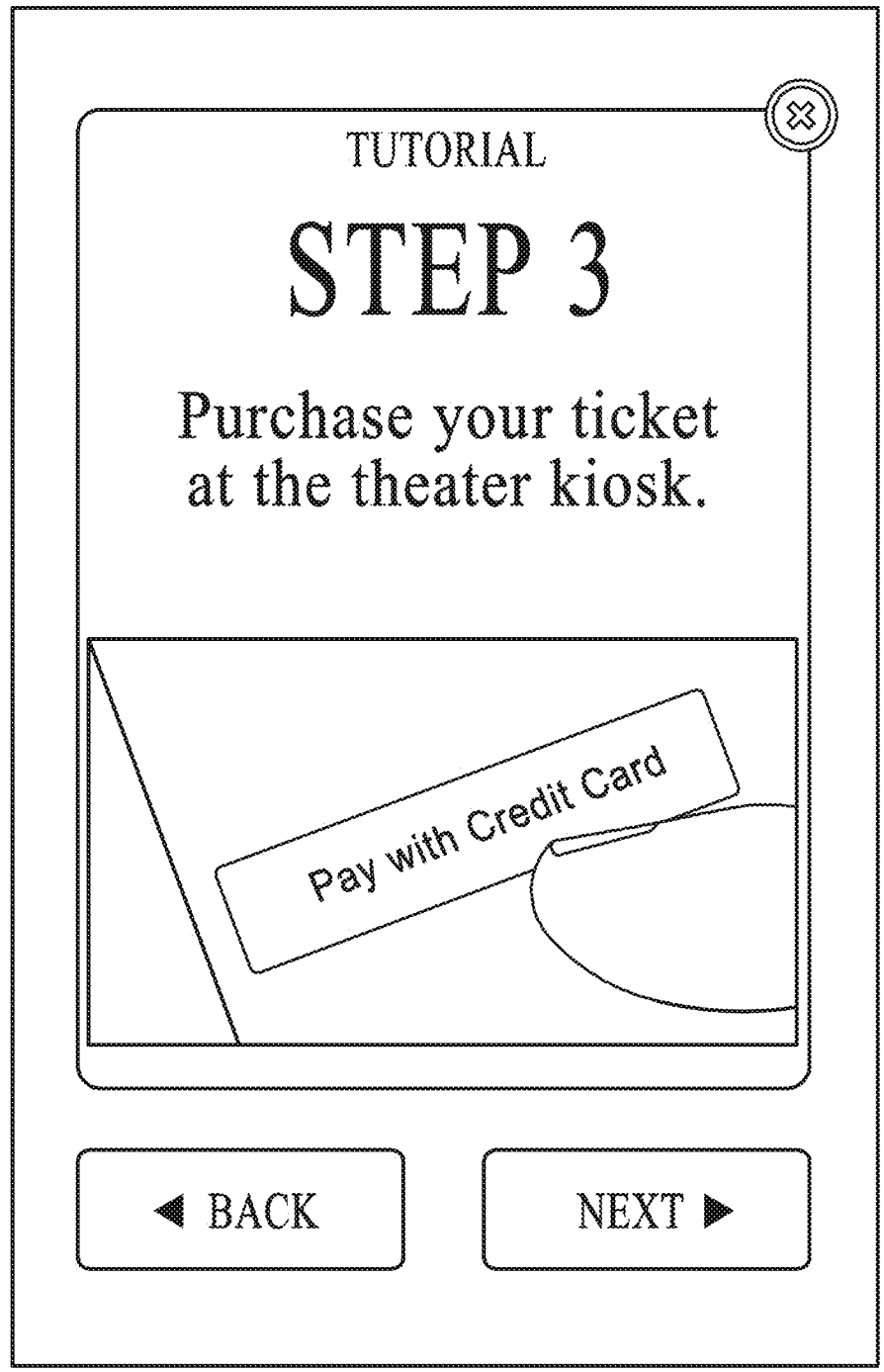

FIG. 11 is a screenshot of step three of the MoviePass™ mobile application user tutorial. It demonstrates how to use the MoviePass™ card at the theater kiosk after it has been loaded.

Figure 12:

FIG. 12 is a screenshot of step four of the MoviePass™ mobile application user tutorial. It demonstrates how to finalize getting the theater ticket by sliding the MoviePass™ card.

Figure 13:
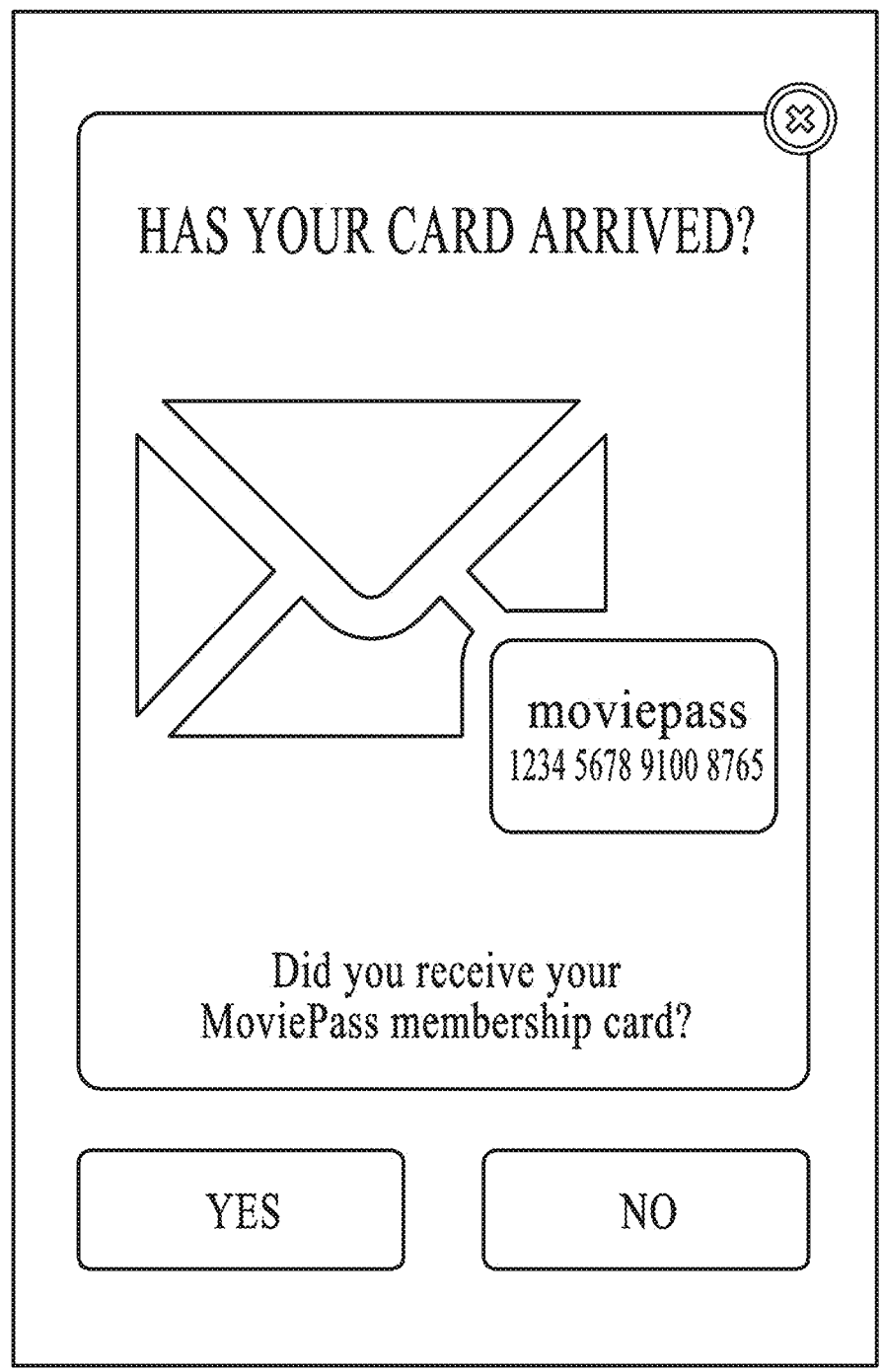

FIG. 13 is a screenshot of the MoviePass™ mobile application asking the user during the tutorial if they have or have not received their MoviePass™ card by mail.

Figure 14:
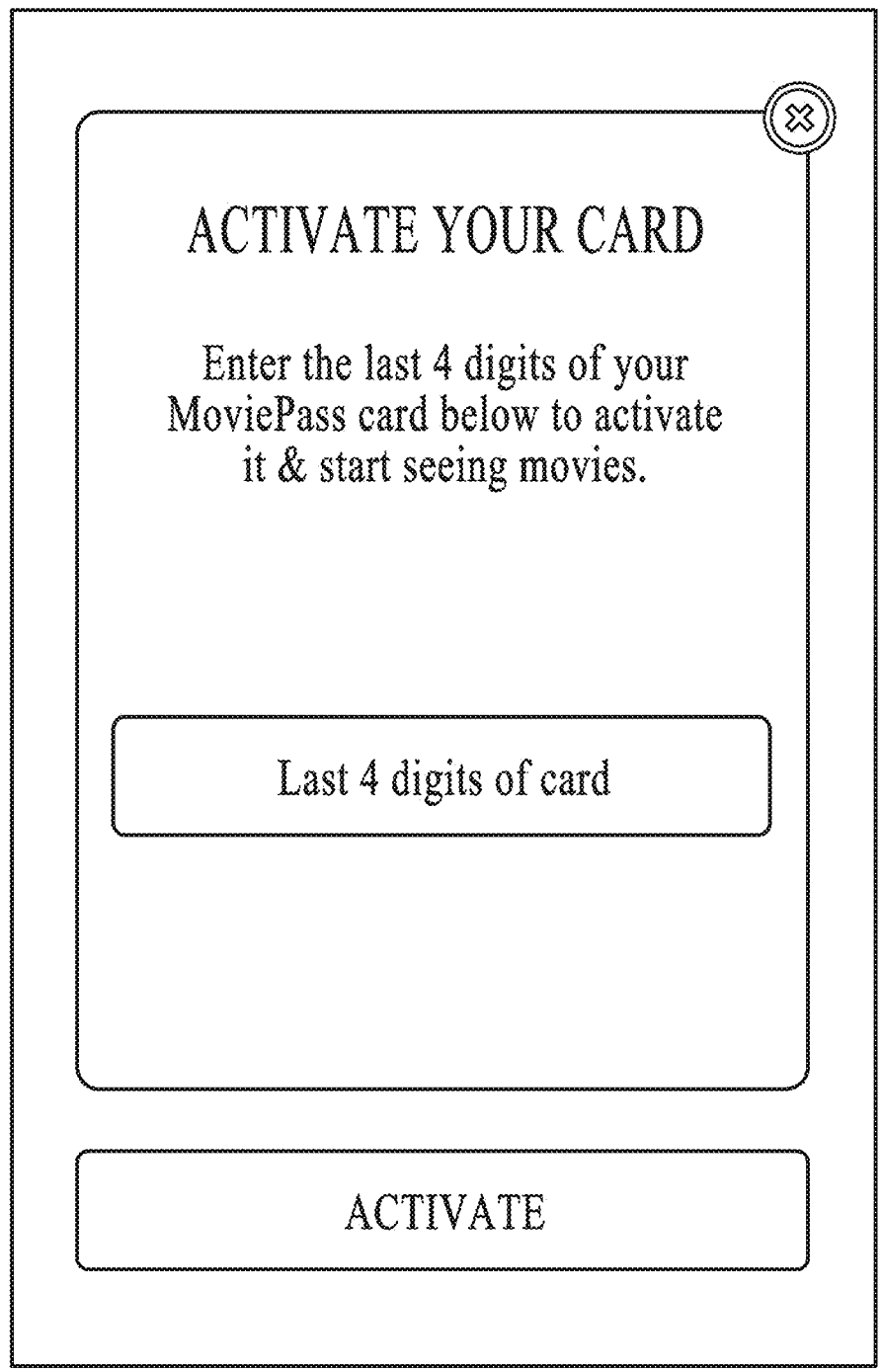

FIG. 14 is the screenshot which follows that in FIG. 13 where the MoviePass™ mobile application user confirms they have physically received their card. The MoviePass™ user is asked to enter digits from their MoviePass™ card to activate it.

Figure 15:
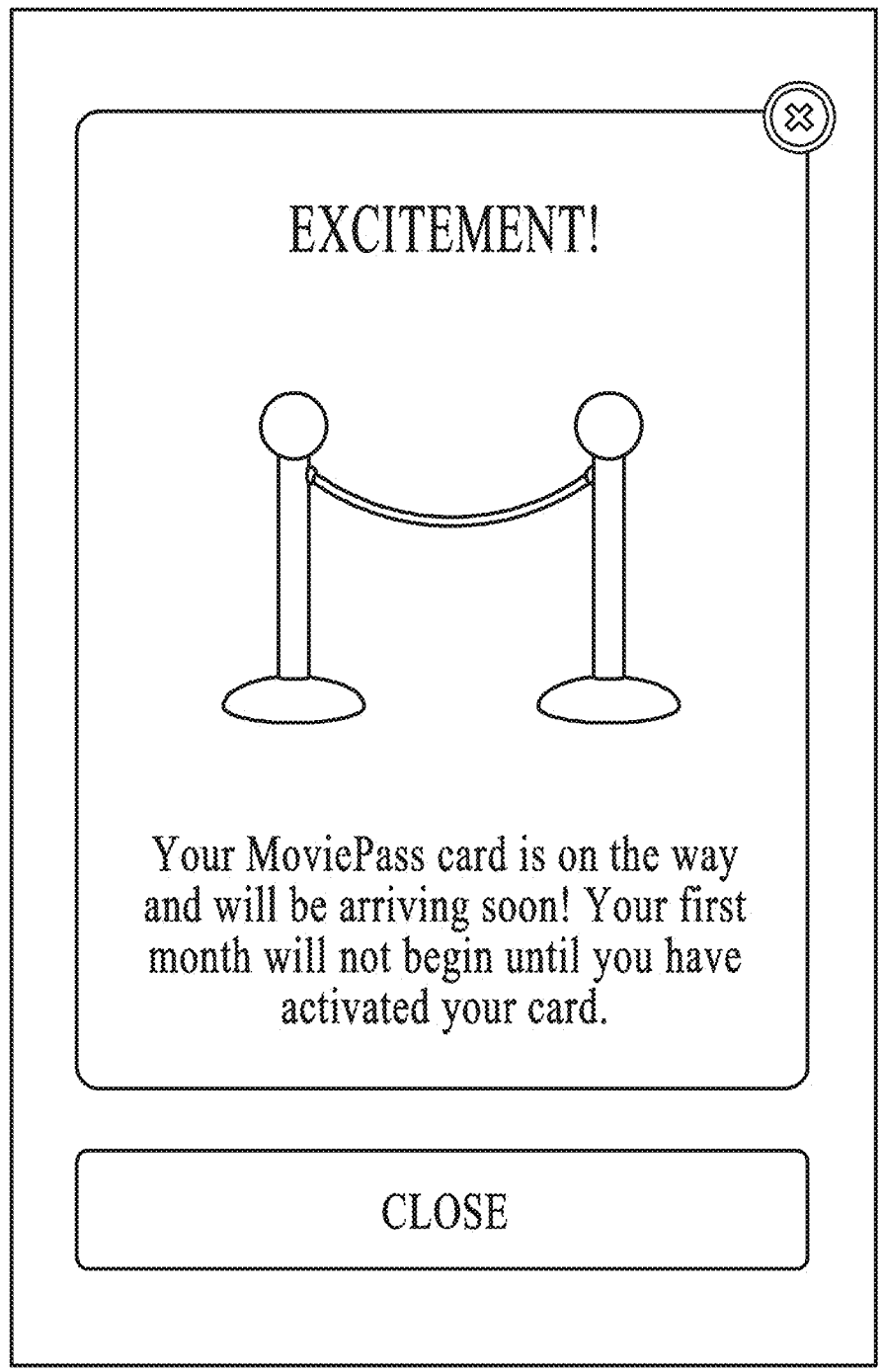

FIG. 15 is the screenshot which follows that in FIG. 13 when the user confirms that they have not physically received their card. It informs the user that the card is soon to arrive and that the first month of subscription will not start until the card is activated.

Figure 16:
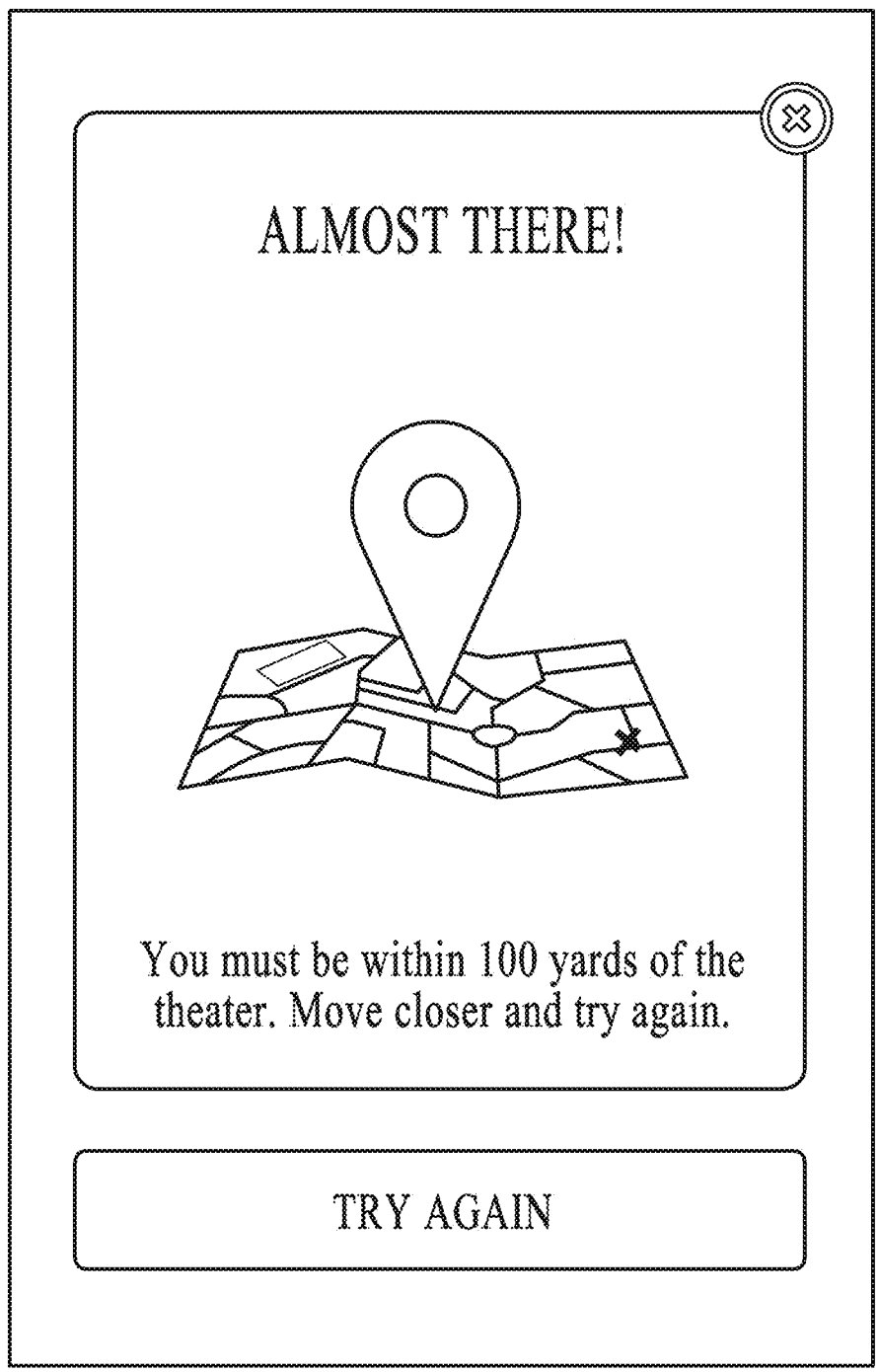

FIG. 16 is a screenshot of the MoviePass™ mobile application warning the user that they are not close enough to the theater to have the movie ticket price loaded to the MoviePass™ card.

Figure 17:
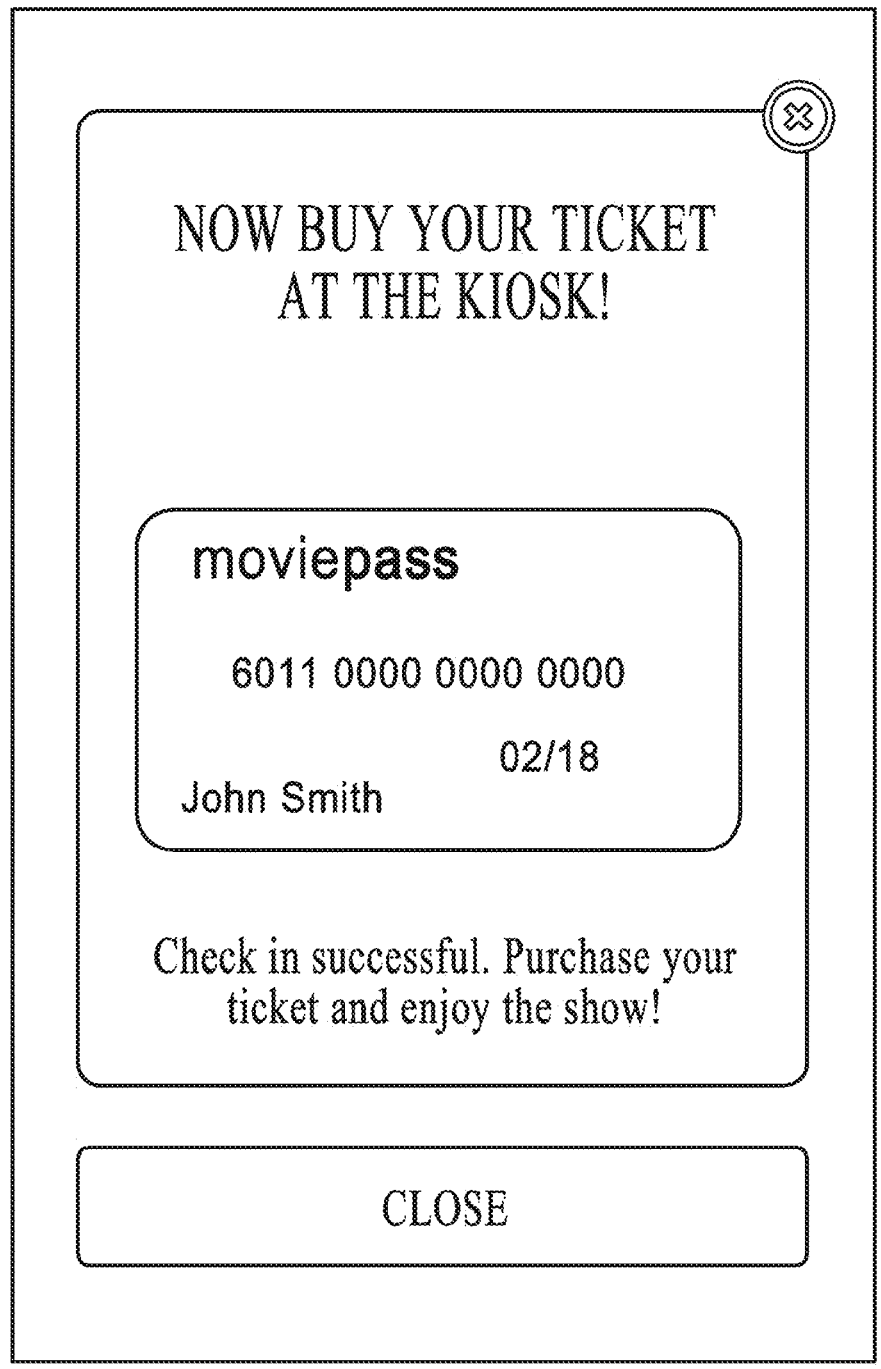

FIG. 17 is a screenshot of the MoviePass™ mobile application informing the user that they are close enough to the theater to check in and have their MoviePass™ card loaded with value so they can purchase their ticket.

FIG. 18 is a screenshot of the MoviePass™ mobile application option to pre-order a movie on the DVD or Blu-Ray format directly from the user mobile device.

Figure 19:
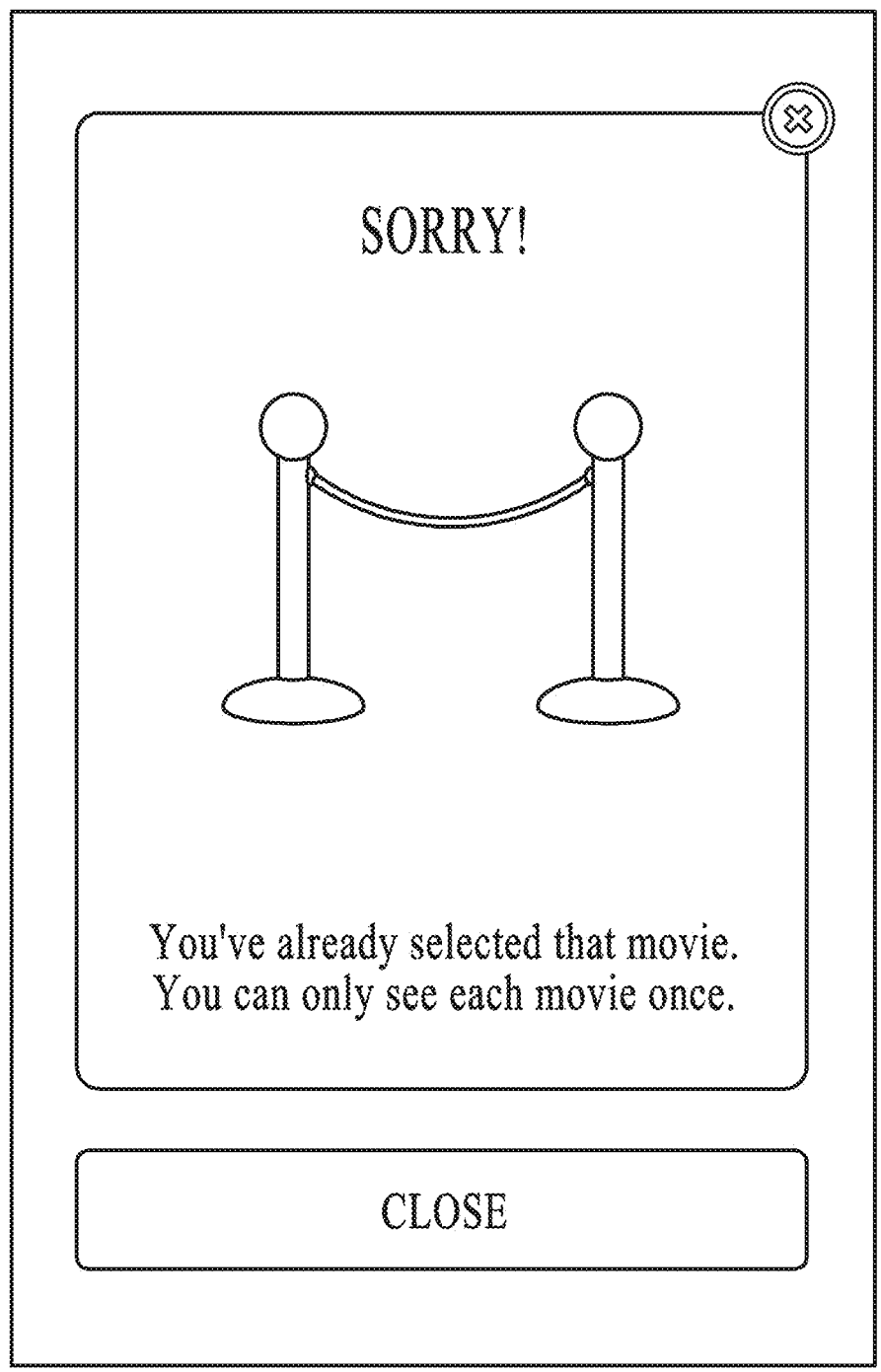

FIG. 19 is a screenshot of the MoviePass™ mobile application rejecting the user's movie selection because a user can only view the same movie title once using their MoviePass™ card.

Figure 20:
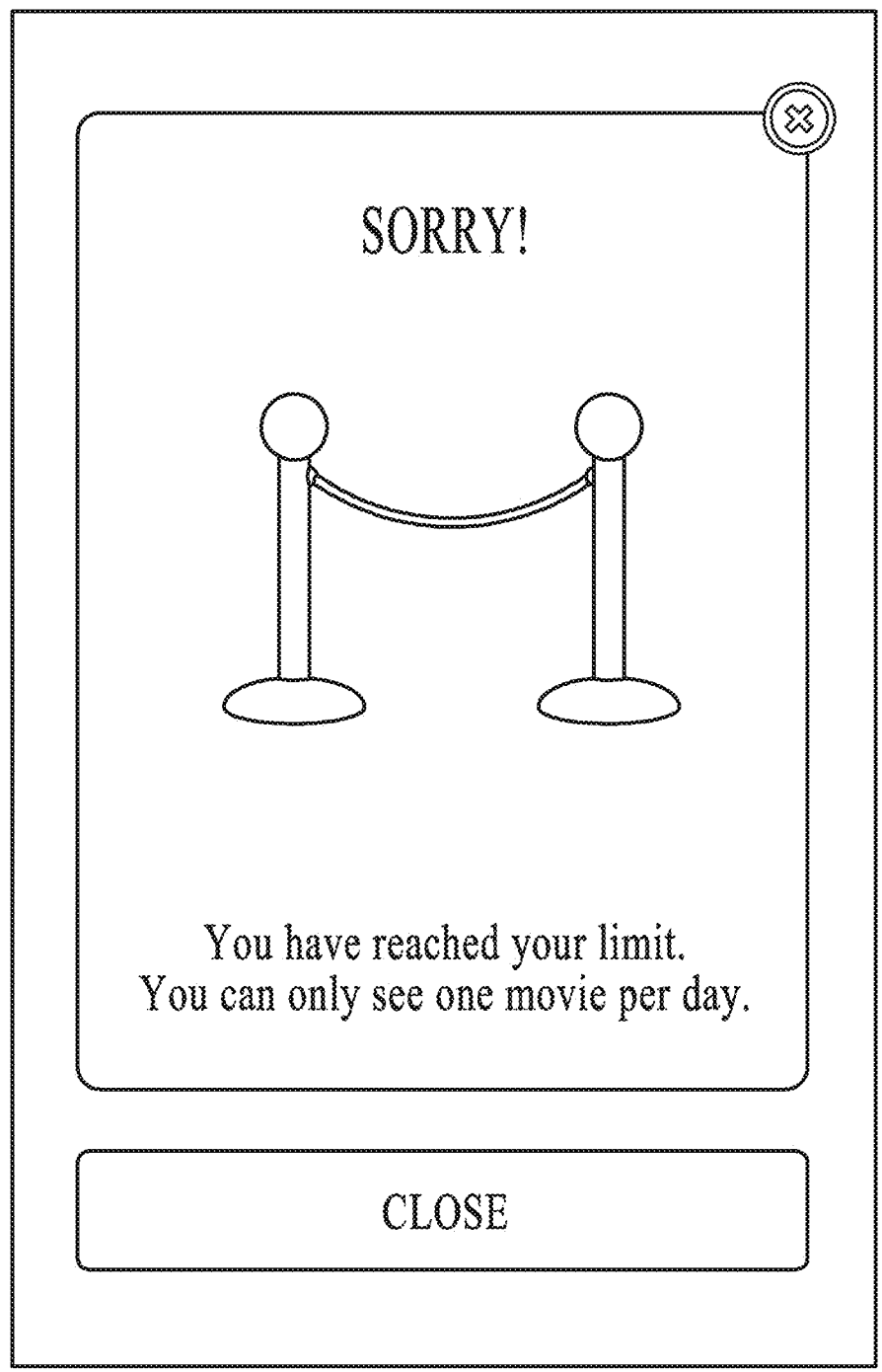

FIG. 20 is a screenshot of the MoviePass™ mobile application rejecting the user's movie selection because the user can only see one movie per day.

Figure 21:
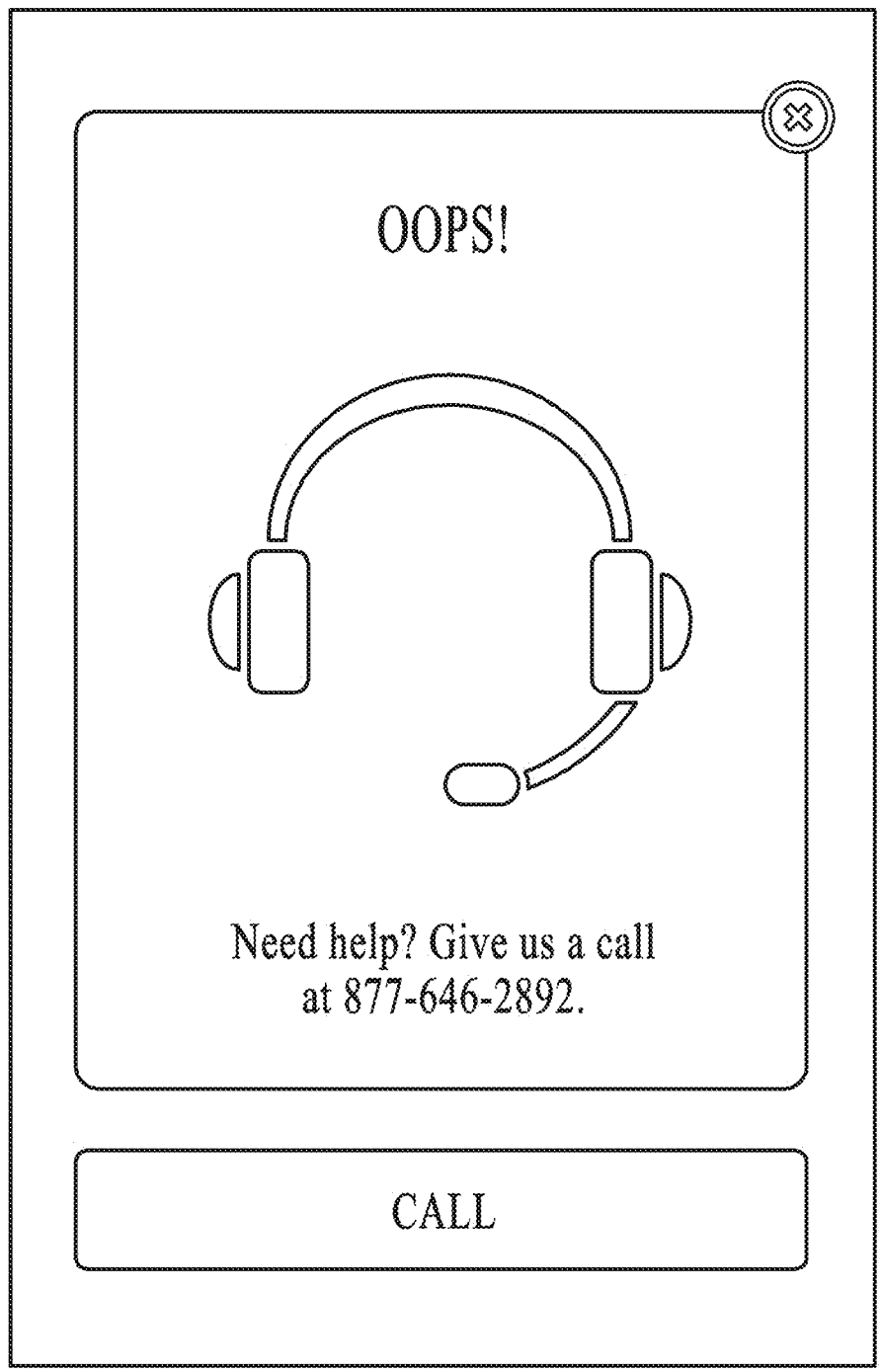

FIG. 21 is a screenshot of the MoviePass™ mobile application "help" screen directing the user to the customer support number. It also has a call button which will allow the user to contact customer support directly through their mobile device or phone.

Figure 22:
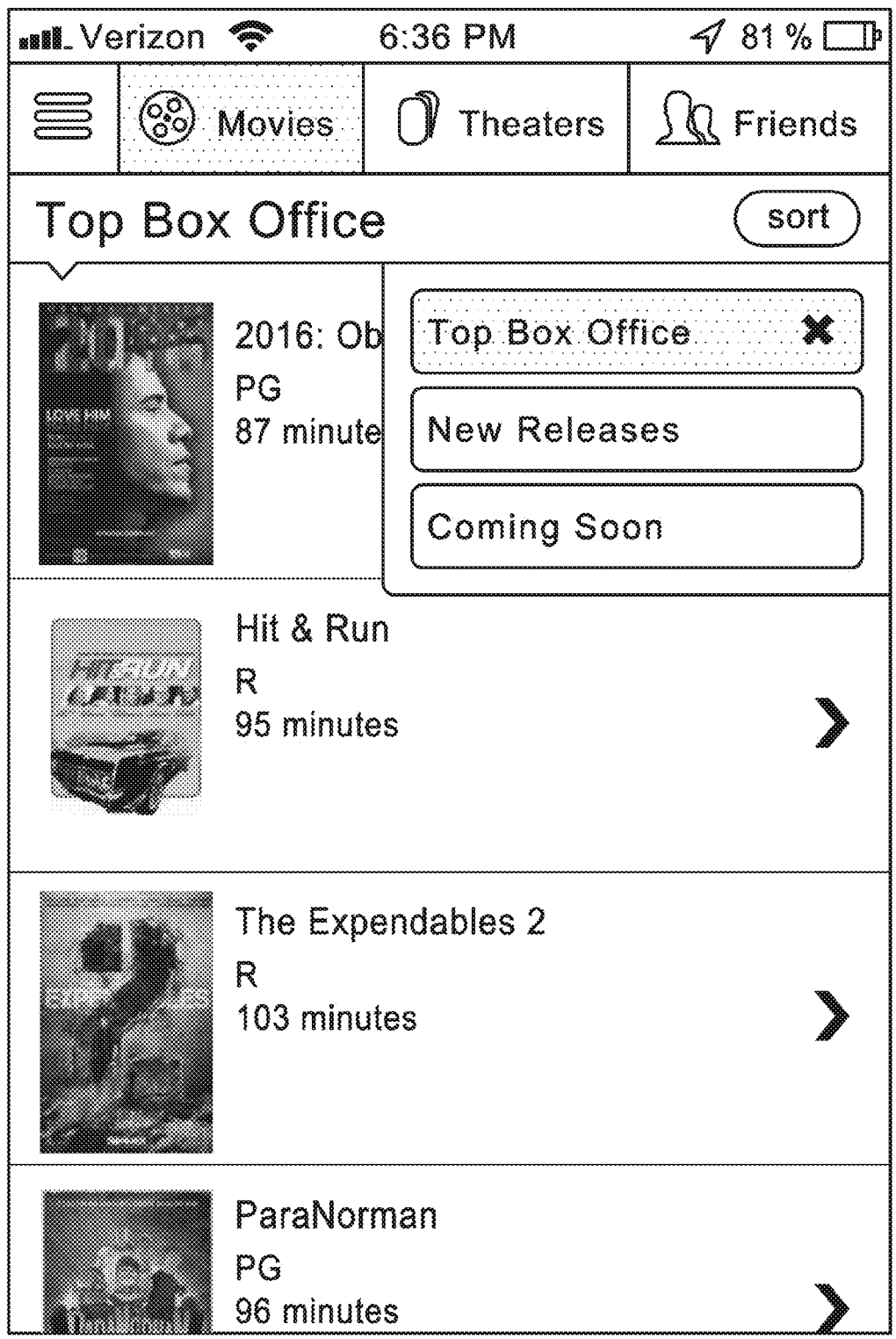

FIG. 22 is a screenshot of the movie tab on the MoviePass™ mobile application demonstrating the "sort" feature which allows users to filter selections of movies they would like to browse.

Figure 23:
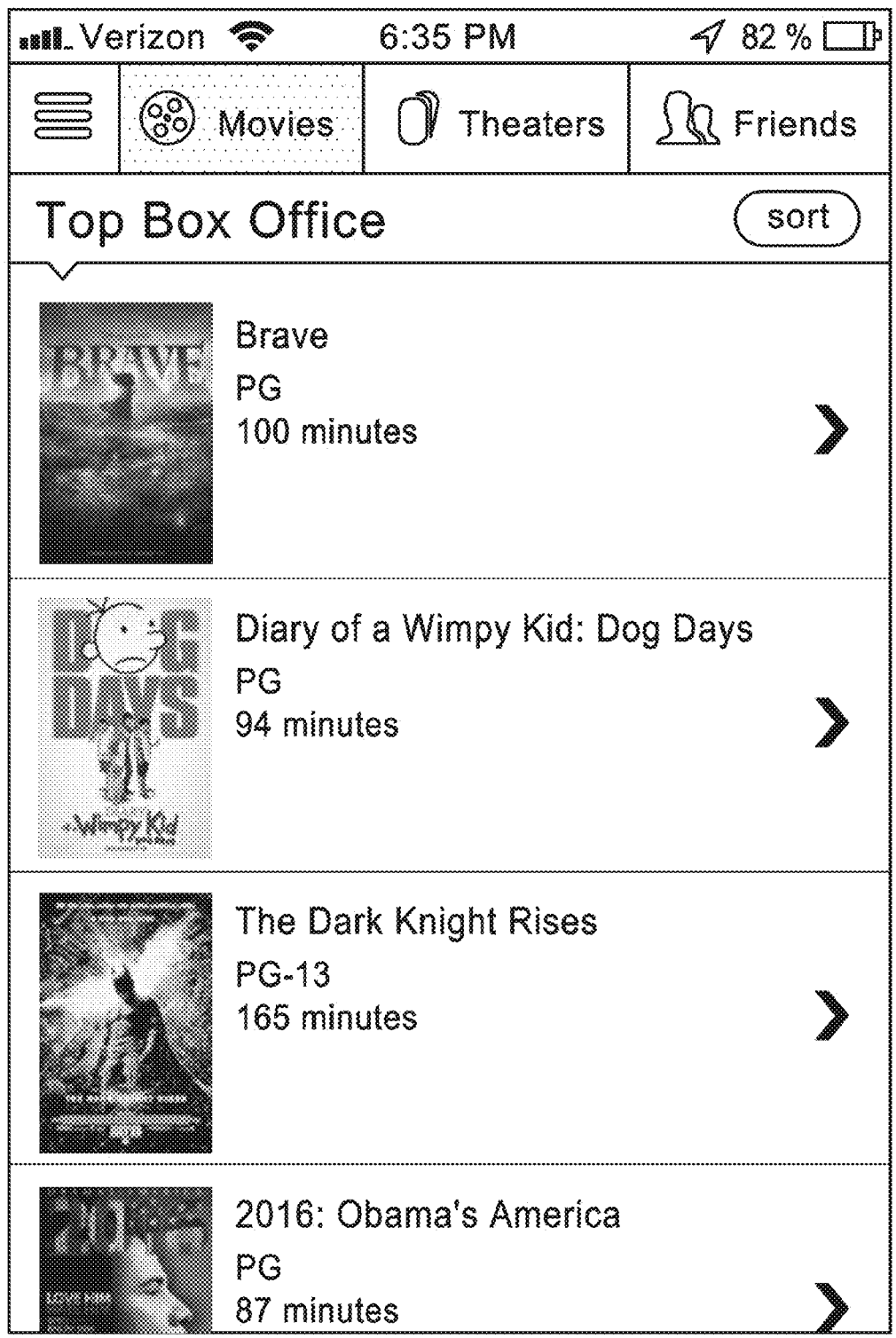

FIG. 23 is a screenshot of the movie tab on the MoviePass™ mobile application as sorted by top box office movies. It states top box office as the sort category at the top of the list between the navigation tabs at the top of the application screenshot and the first itself.

Figure 24:
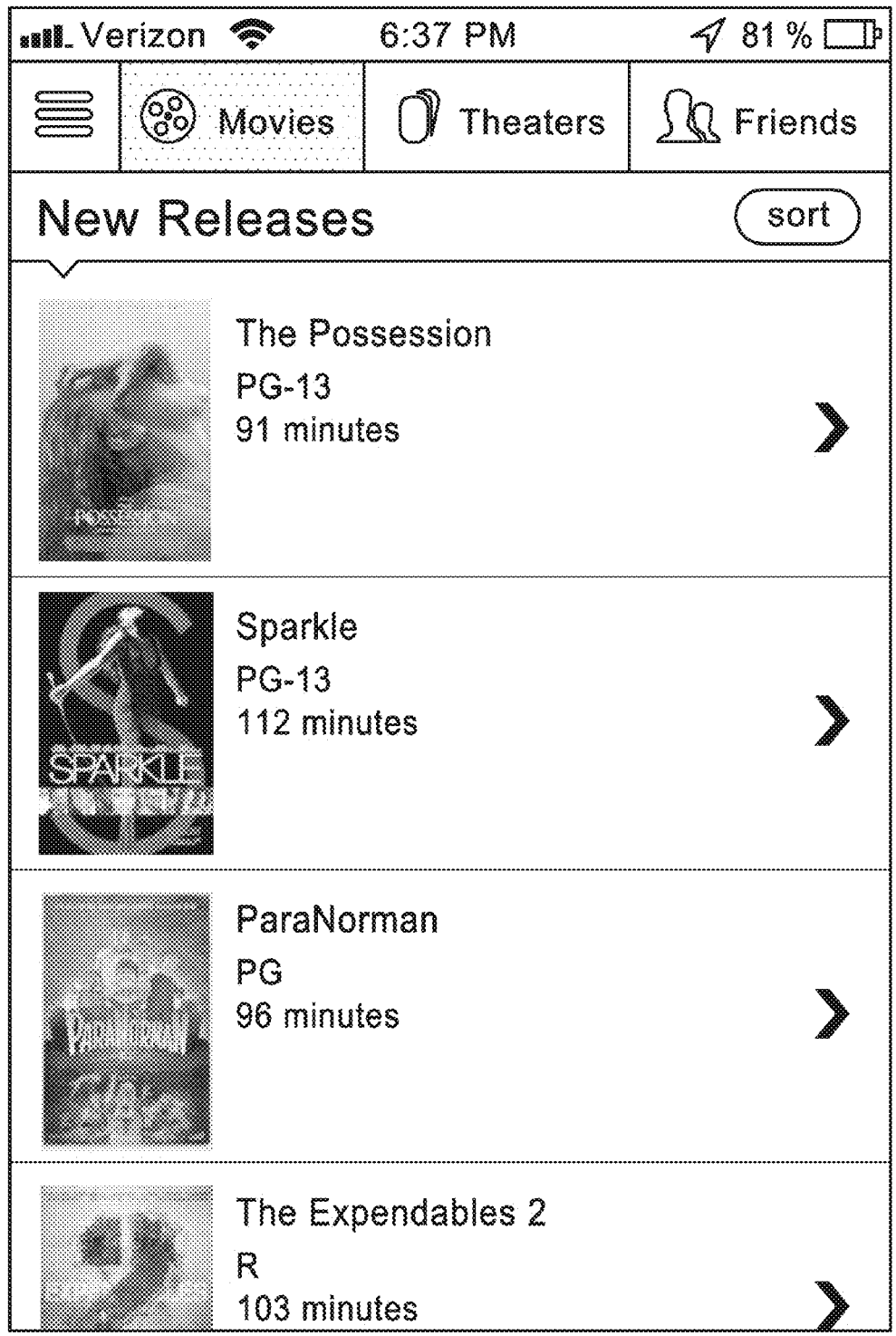

FIG. 24 is a screenshot of the movie tab on the MoviePass™ mobile application as sorted by the new releases category of movies. It states new releases as the sort category at the top of the list under the navigation tabs.

Figure 25:
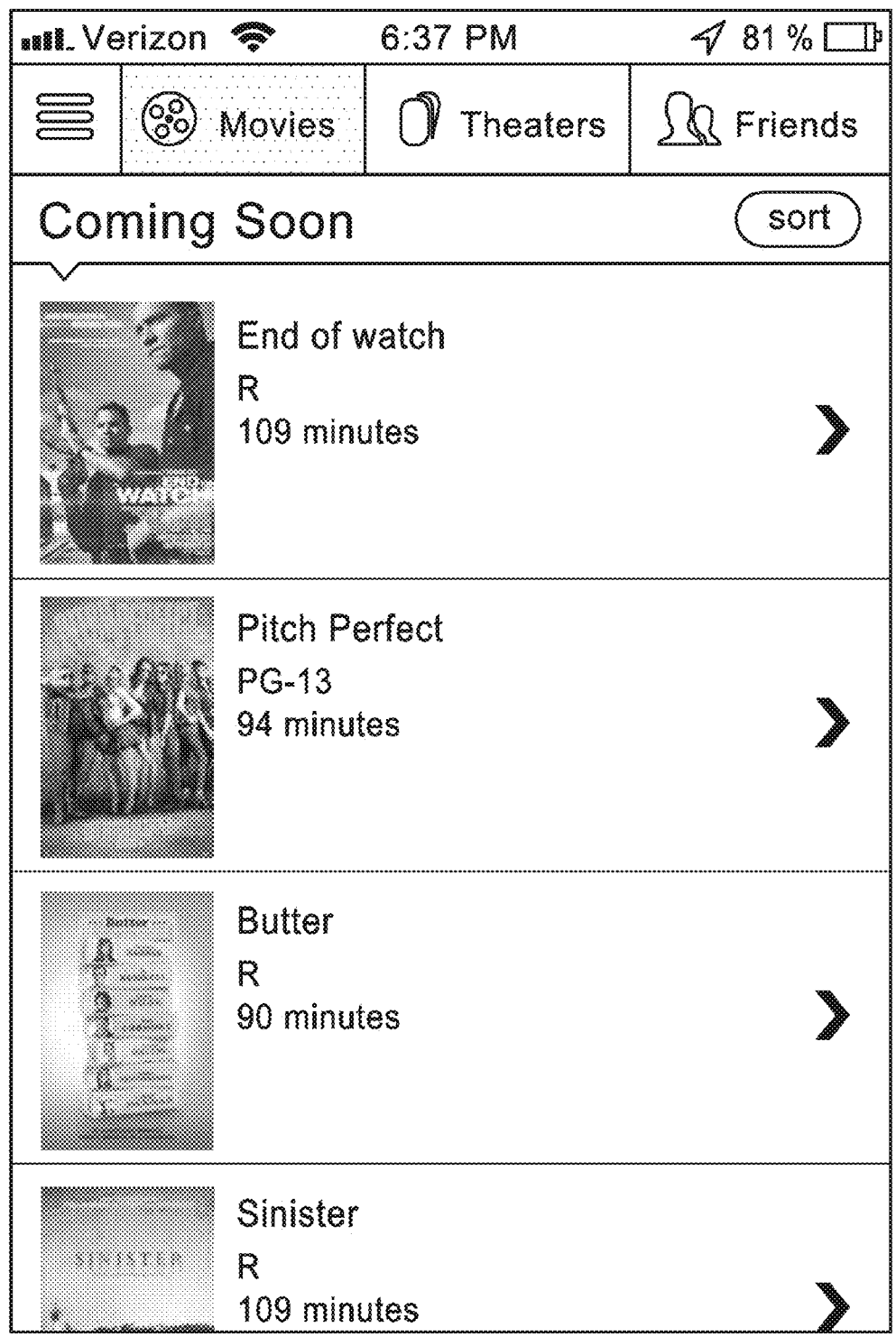

FIG. 25 is a screenshot of the movie tab on the MoviePass™ mobile application as sorted by coming soon movies. It states coming soon as the sort category at the top of the list under the navigation tabs.

Figure 26:
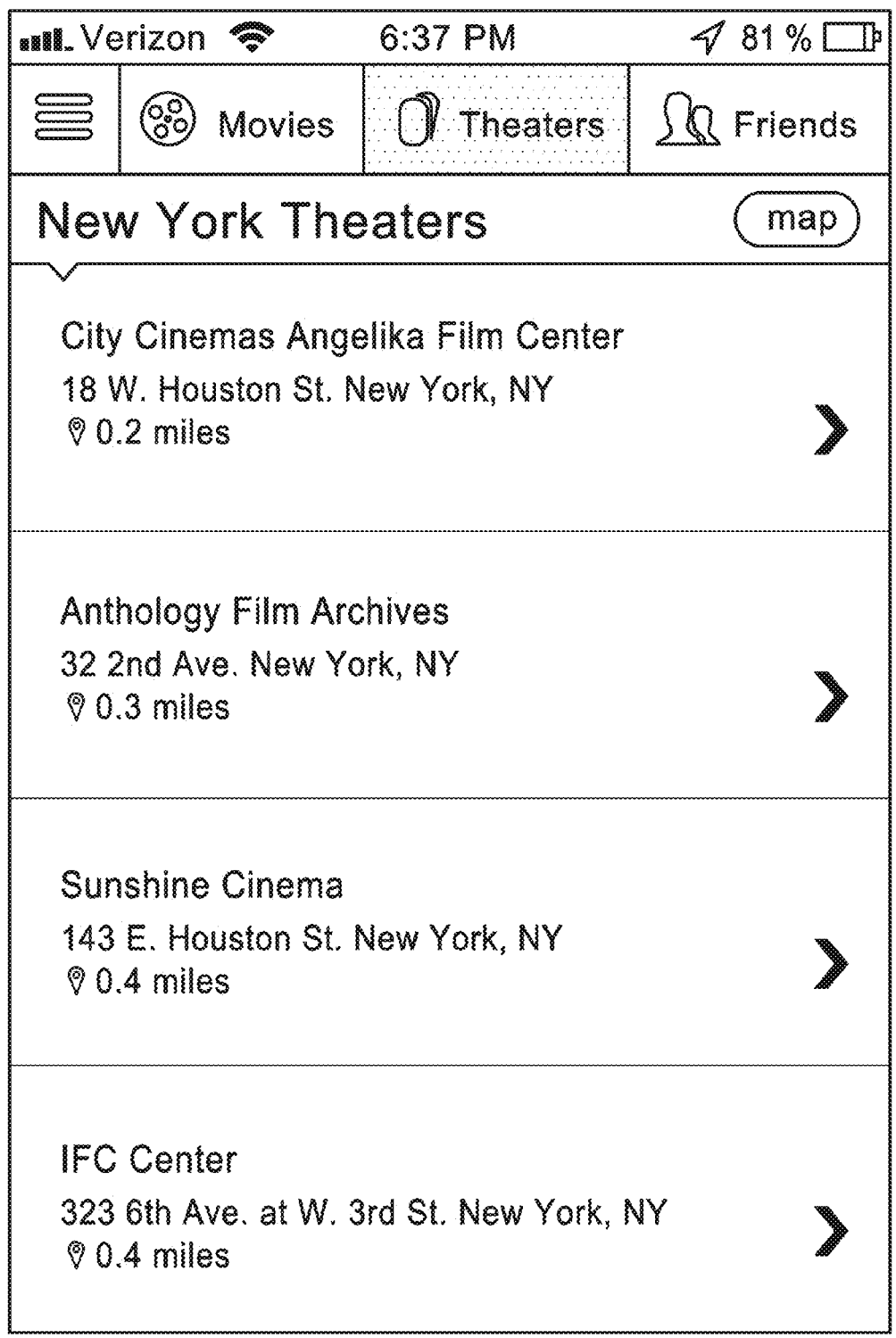

FIG. 26 is a screenshot of the theaters tab on the MoviePass™ mobile application. The theaters are displayed in a list and sorted by proximity. The user can see the theaters on a map by selecting the map option near the top right of the screenshot.

Figure 27:
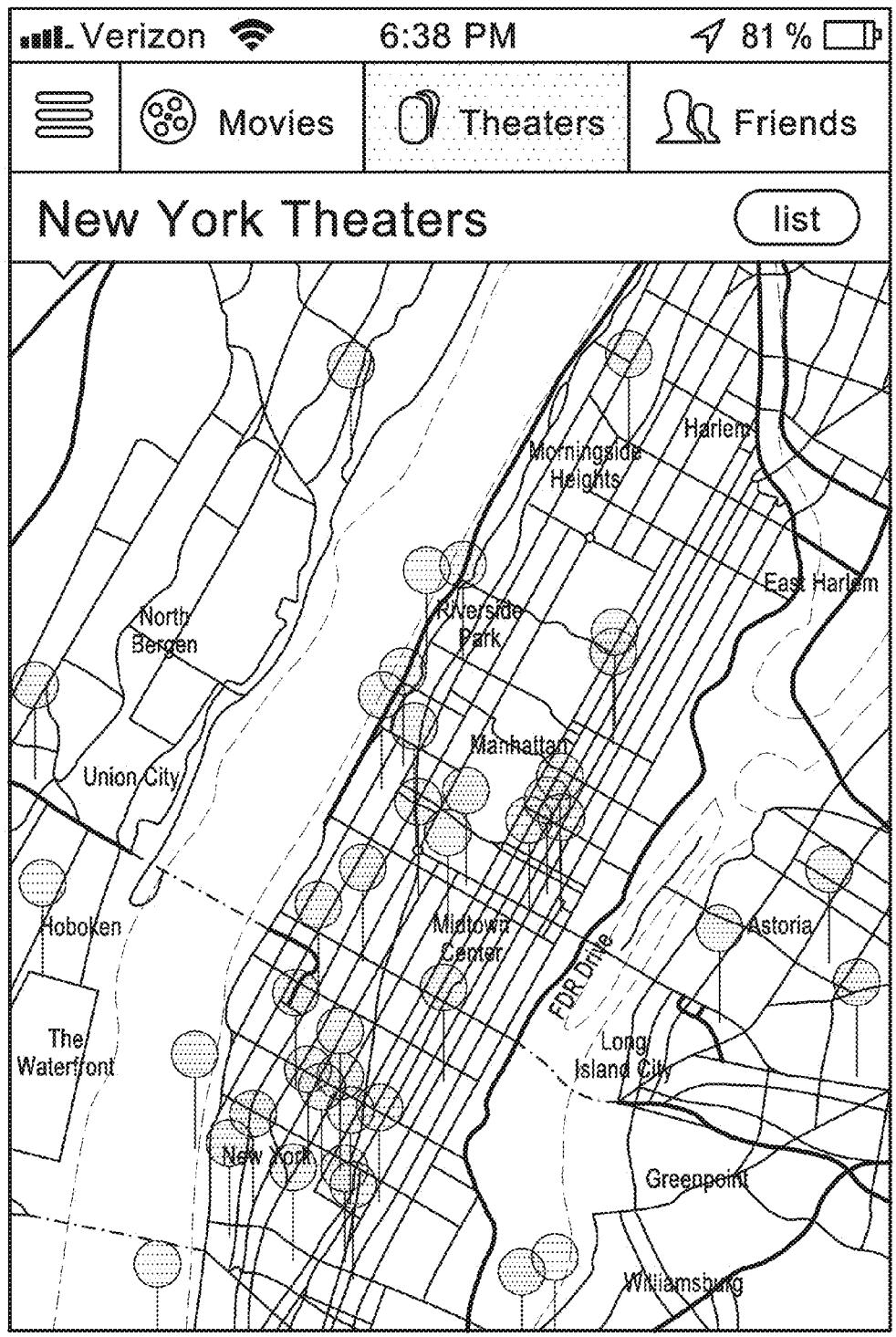
Figure 28:
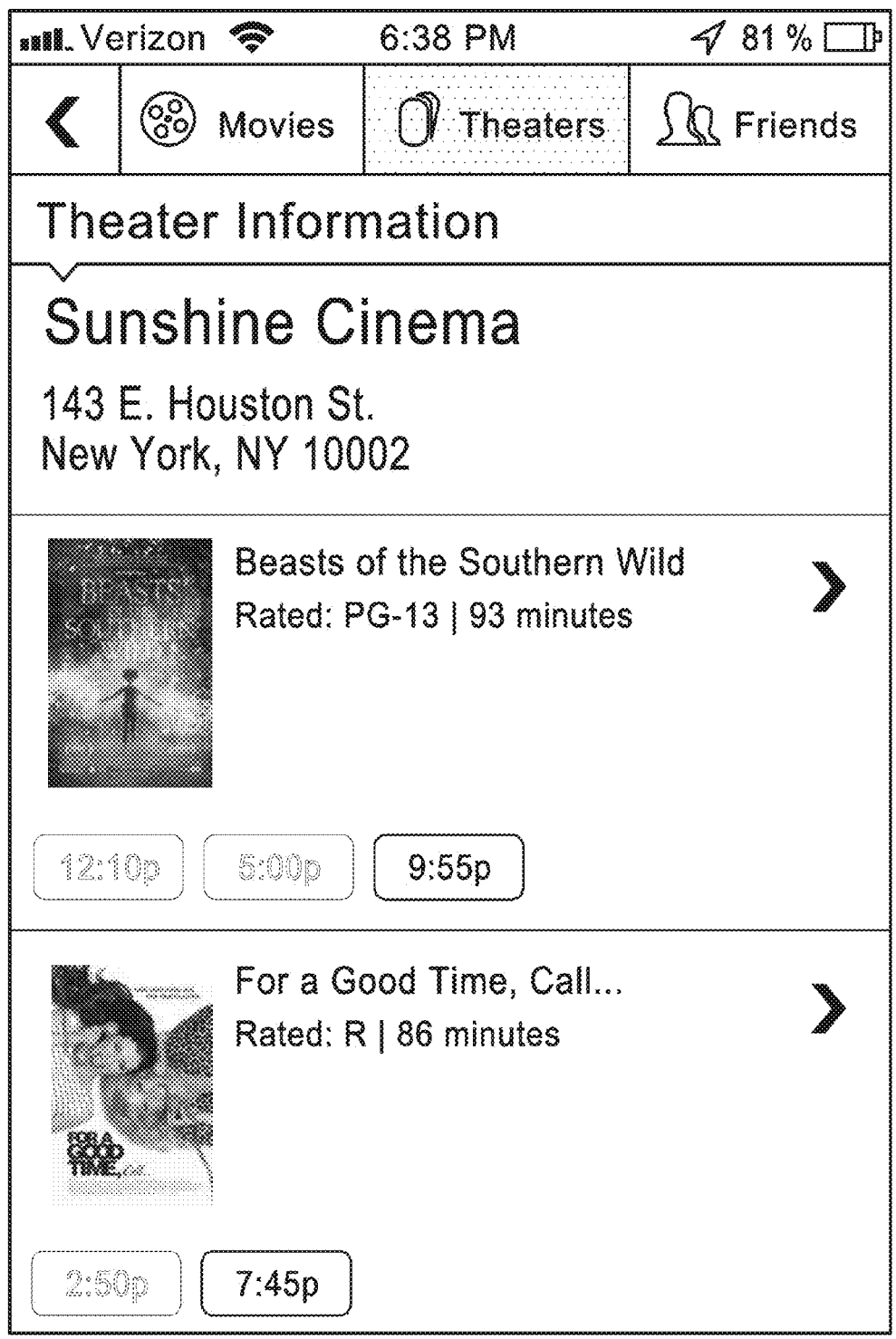

FIG. 27 is a screenshot of the theaters tab on the MoviePass™ mobile application as displayed on a map. The map shows the user's current location with a blue dot. The red pins by the user are the theaters near the user. When the user presses one of the red pins, detailed information and show times are displayed as in the screenshot in FIG. 28. FIG. 28 is a screenshot of the selected theater information from either the nearby theater list demonstrated in FIG. 26 or the nearby theater map as demonstrated in FIG. 27. Under the theater information page the user will find the name, address and movie times for the theater selected.

Figure 29:
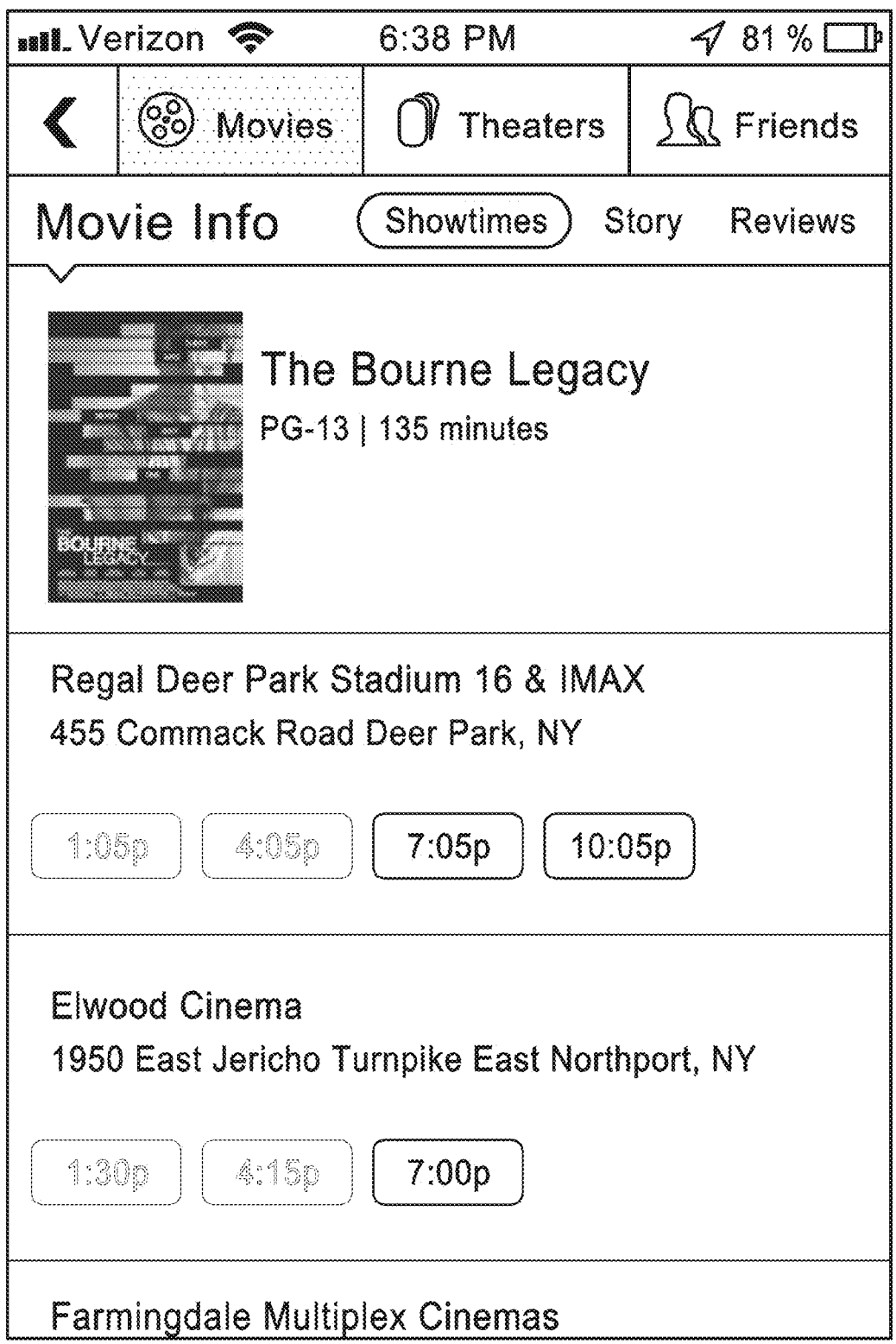
Figure 30:

FIG. 29 is a screenshot of the movies tab on the MoviePass™ mobile application displaying movie information for a chosen movie from the movie tab list shown in FIG. 26. The movie information contains the name, MPAA rating and length of the movie. Below the movie information is a list of nearby theaters showing the movie and the show times at those locations. The user may select any show time in red. Once a user chooses a show time they are prompted to activate the MoviePass™ card by checking in at the theater they selected. The user will be prompted to check in at the theater (and accordingly load their MoviePass™ card) by the information screen shown in FIG. 30. If the user is not close to enough to the theater, the user will be notified as demonstrated in FIG. 16.

Figure 31:
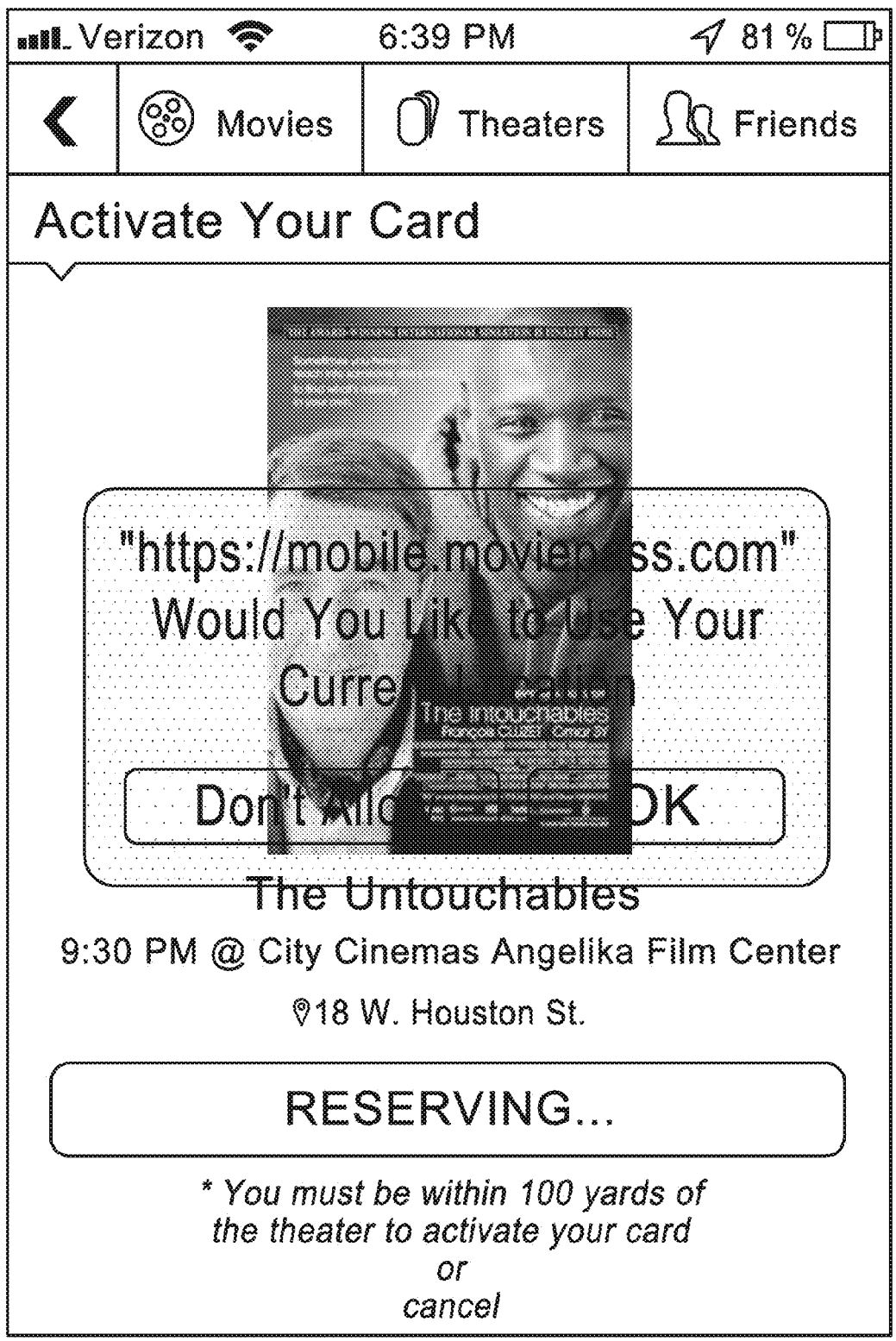

FIG. 31 is a screenshot of the notification a mobile application user receives when the MoviePass™ mobile application wants approval to use the user's mobile devices current location to activate their MoviePass™ card.

Figure 32:
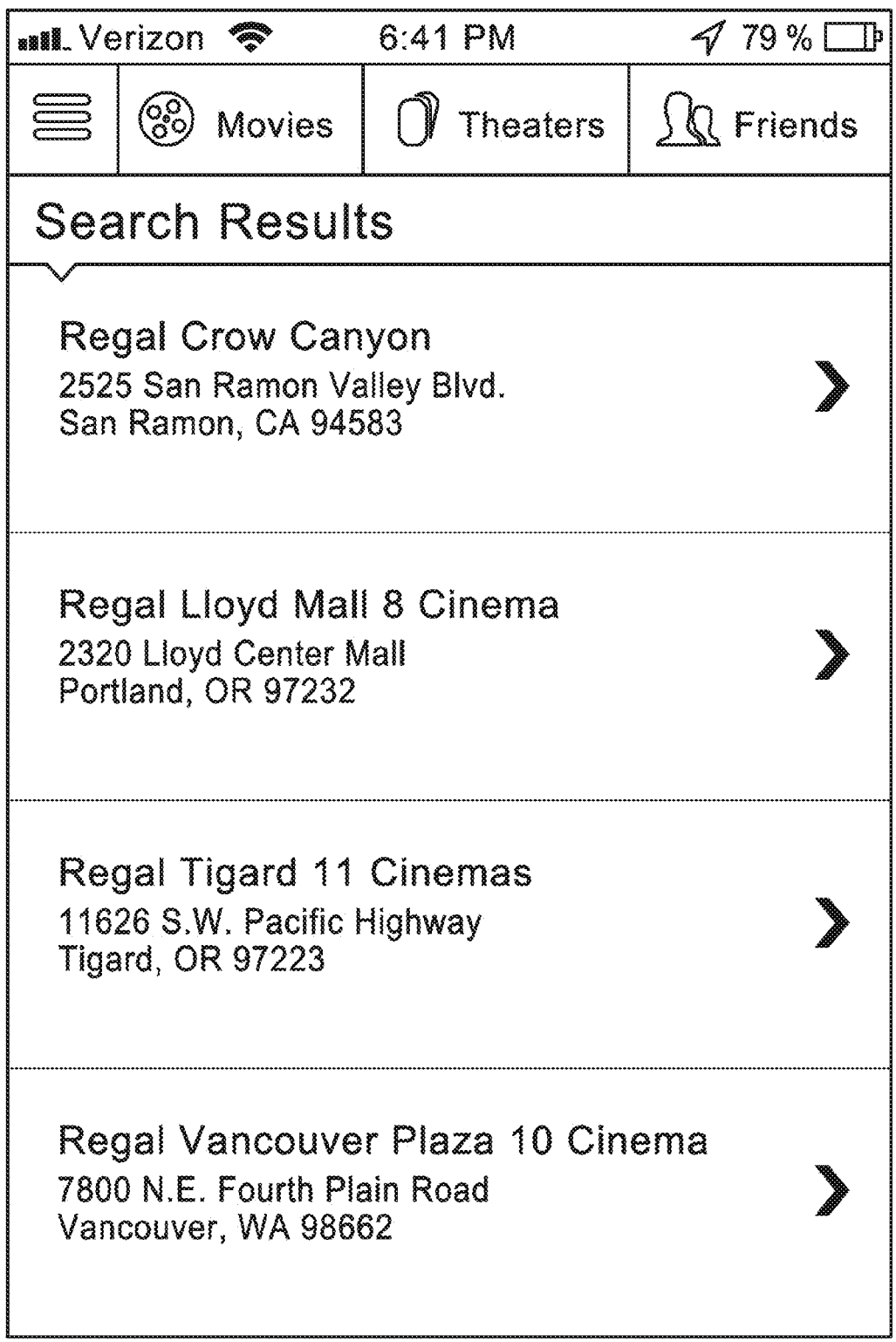

FIG. 32 is a screenshot of search results listed by theater.

Figure 33:
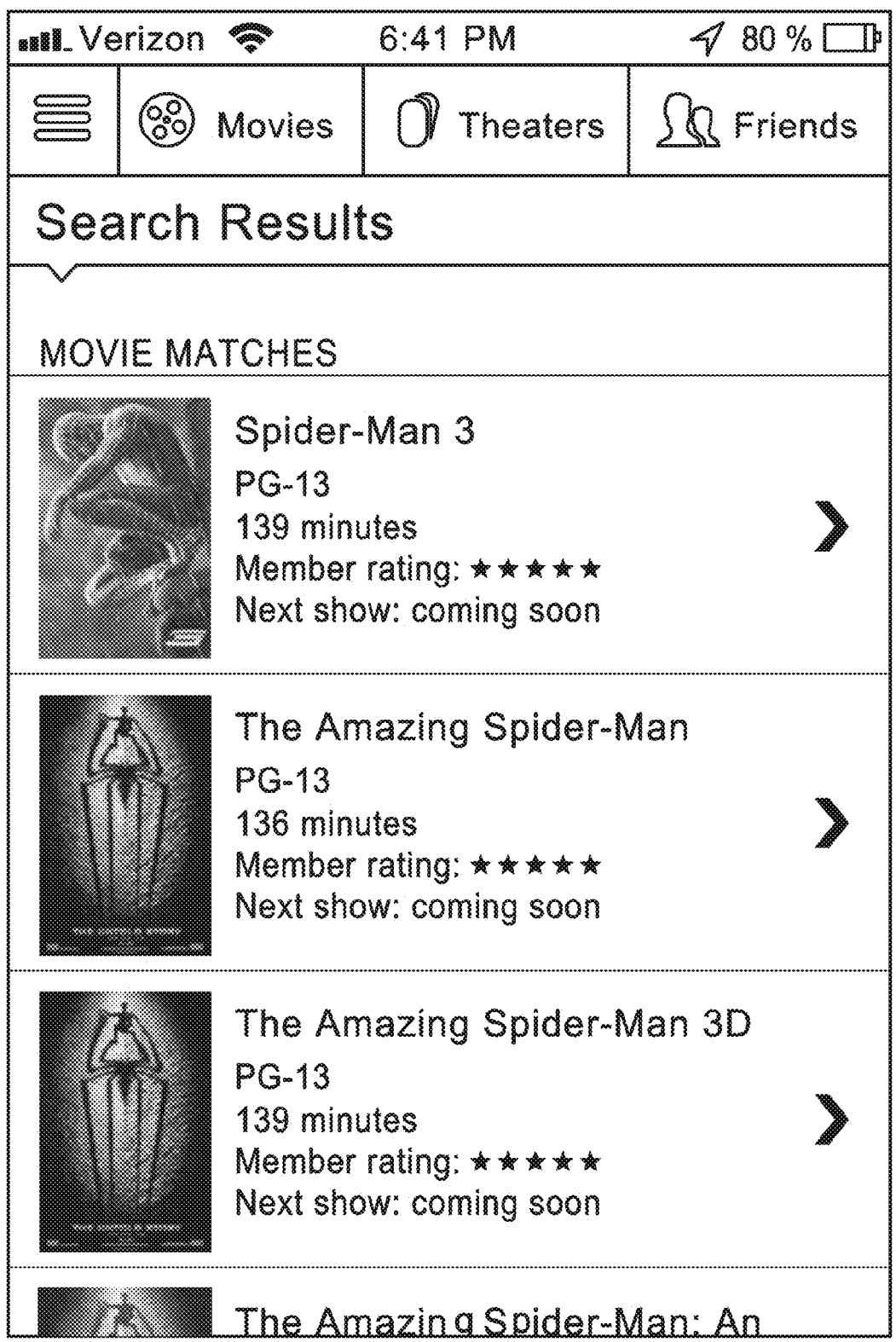

FIG. 33 is a screenshot of search results listed by movie title.

Figure 34:
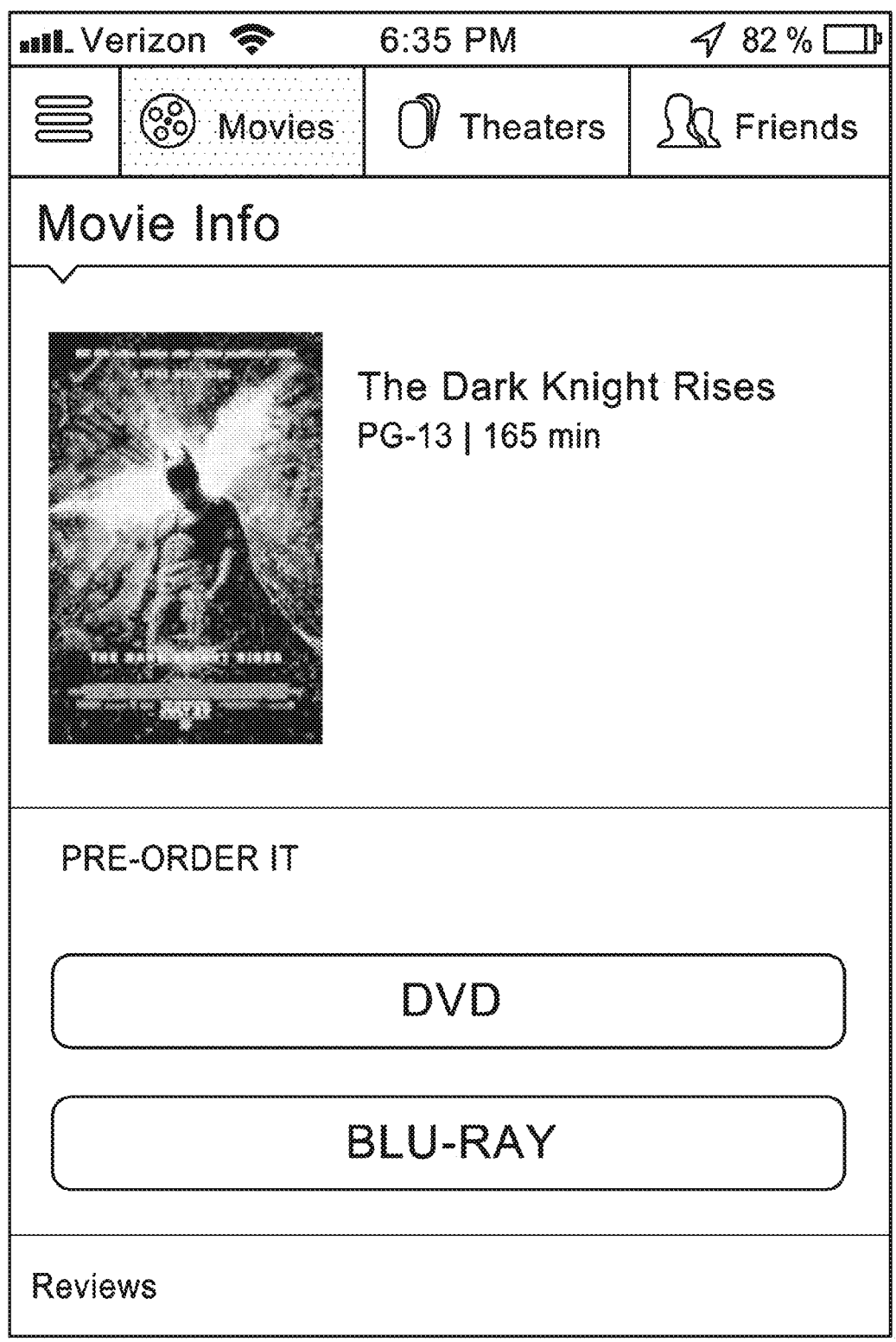

FIG. 34 is a screenshot of movie information for a movie which has yet to be released from theaters. It provides movie information including title, MPAA rating and duration in time. It also provides the user options to pre-order the movie on different formats and to browse reviews of the movie.

Figure 35:
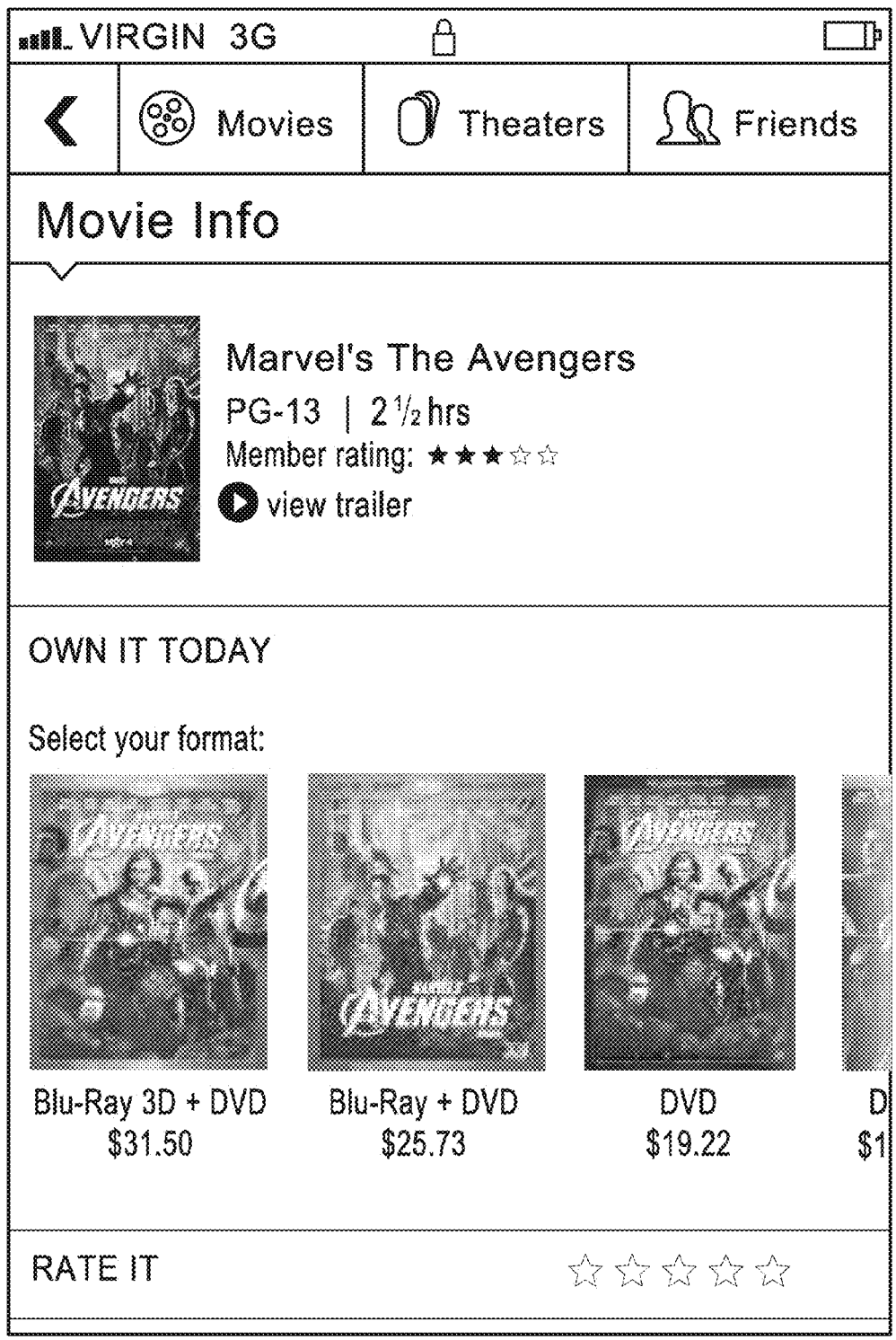

FIG. 35 is a screenshot of movie information for a movie which has been released from theaters. It provides movie information including title, MPAA rating and duration in time. It also provides the user options to purchase the movie today in several formats. Because the movies have already been released to other formats the application displays the movie box covers for these formats.

Figure 36:
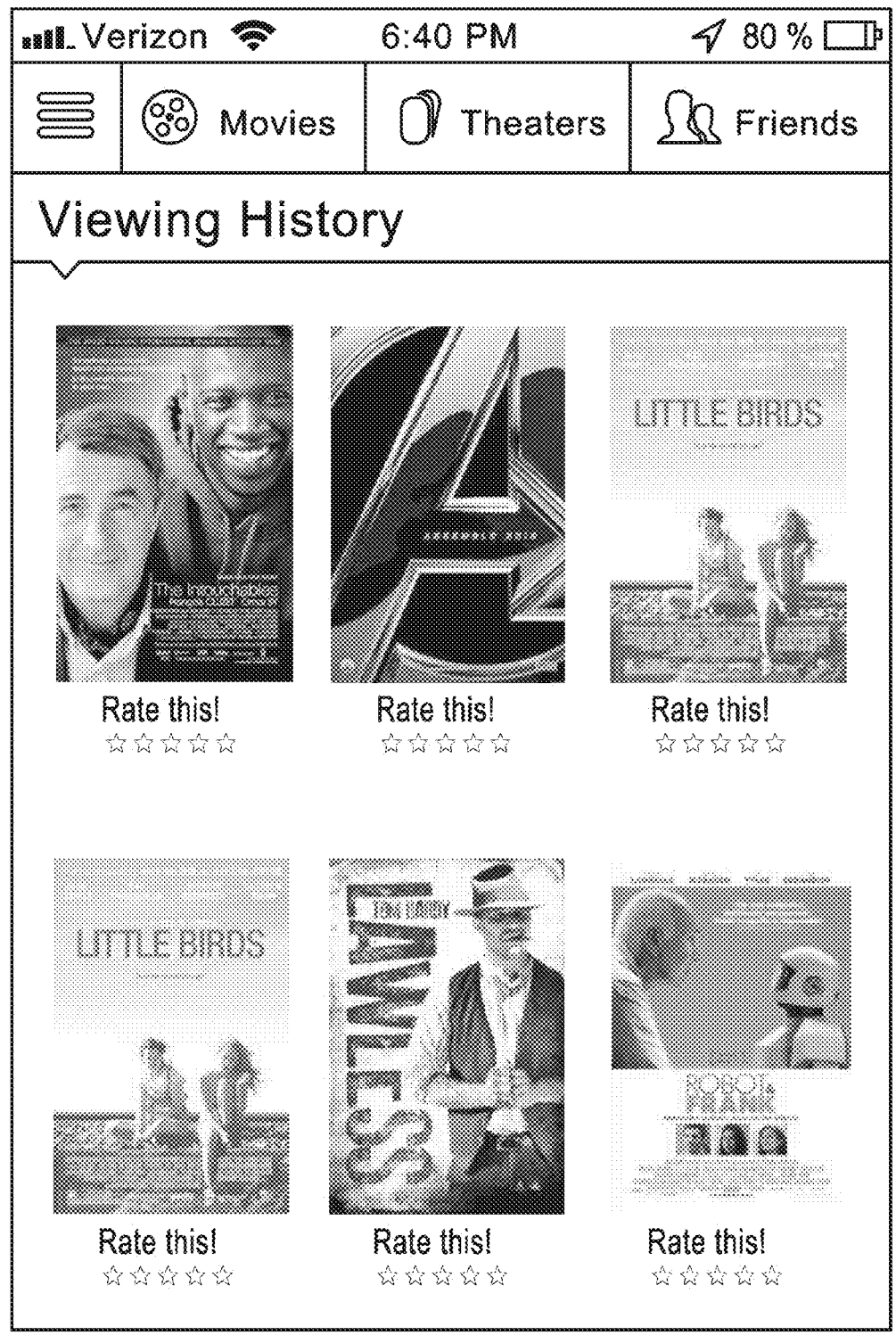

FIG. 36 is a screenshot of the viewing history of the MoviePass™ user. It shows the user what movies they have seen in the past and provides the user an option to rate the movie under each title.

Figure 37:
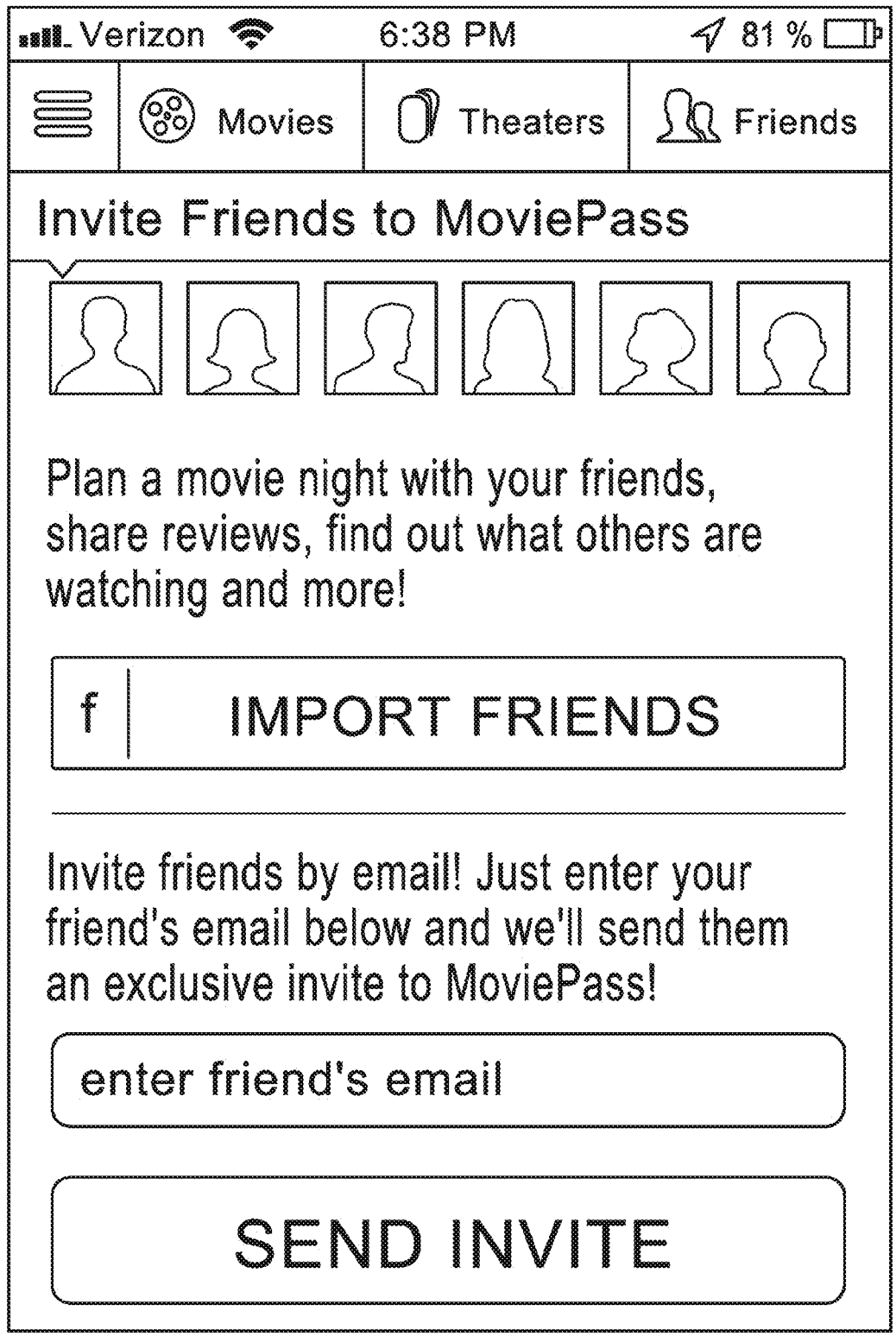

FIG. 37 is a screenshot of the invite friends to movie pass screen on the mobile application. This function allows the user to invite friends to use the MoviePass™ service either by accessing their friends list from a social network or by manually inputting a contact email.

Figure 38:
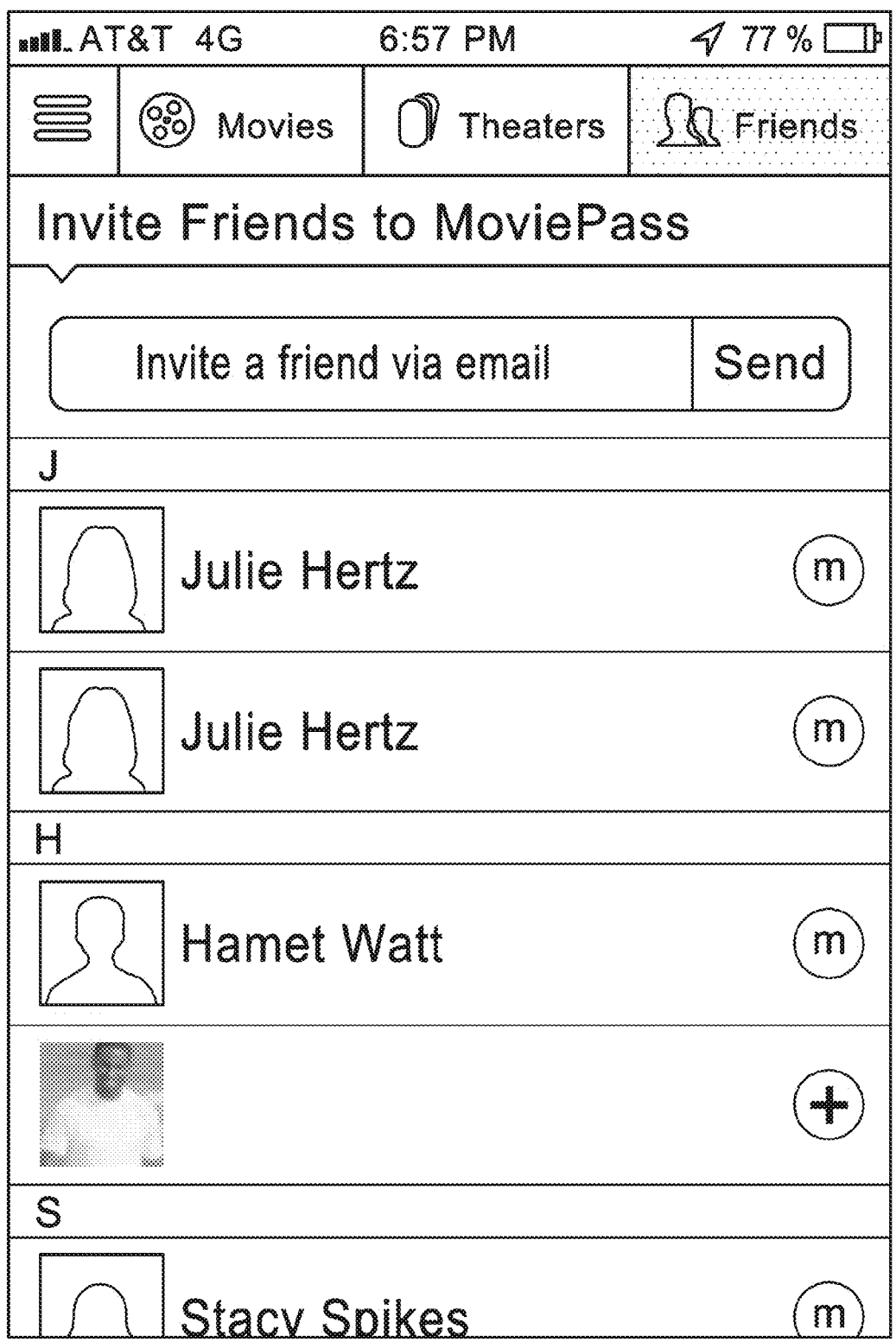

FIG. 38 is a screenshot of the contact book of the invite friends feature on the mobile application.

Figure 39:
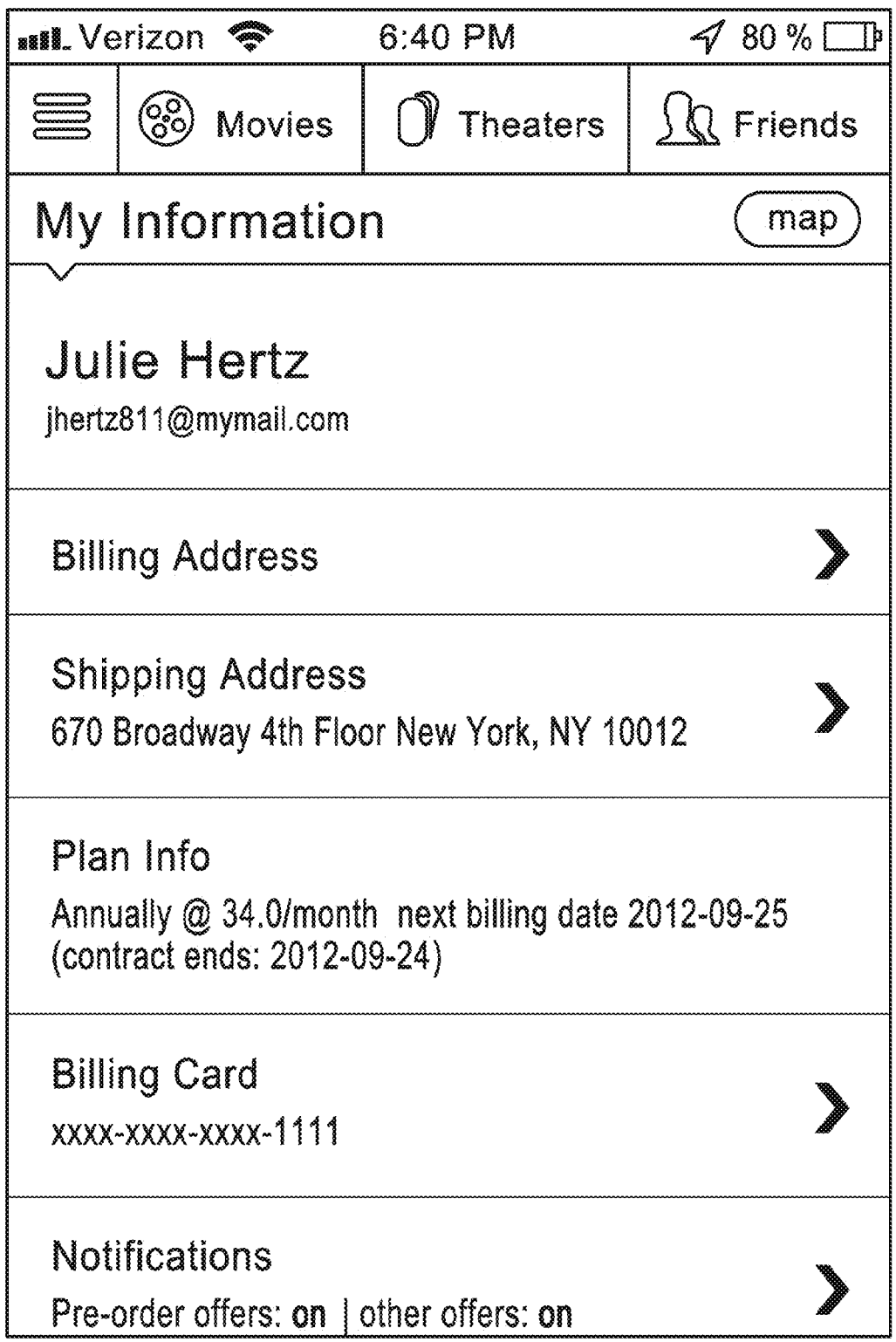

FIG. 39 is a screenshot of the user information page on the MoviePass™ application. It contains the user's personal information including billing address, shipping address, subscription plan information, billing card and other notification settings.

Figure 40:
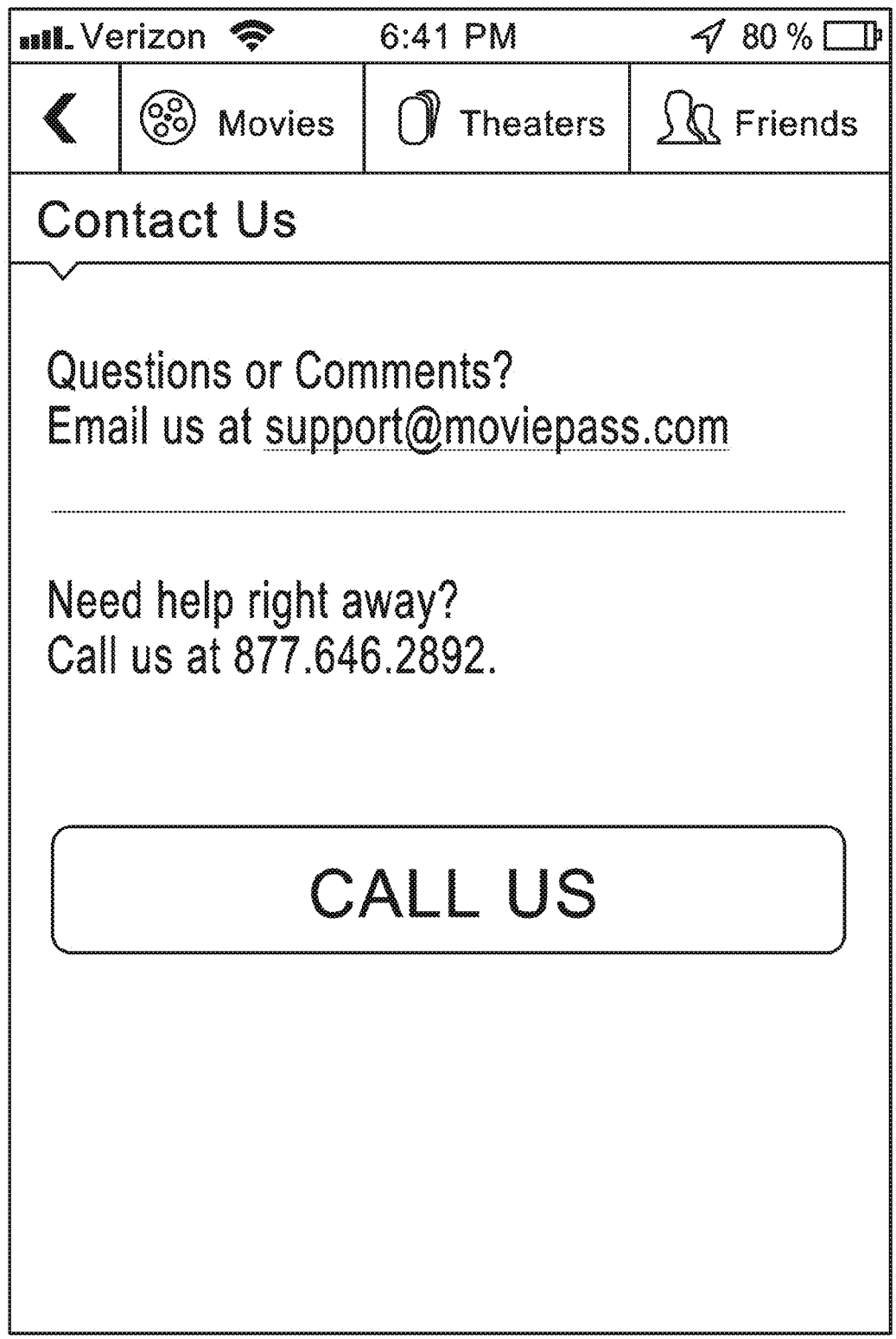

FIG. 40 is a screenshot of the contact information for a user to contact the MoviePass™ team directly with comments or questions. From this screen a user can either email the support team directly or call MoviePass™ support by dialing the number listed or pressing the call button within the mobile application.

Figure 41:
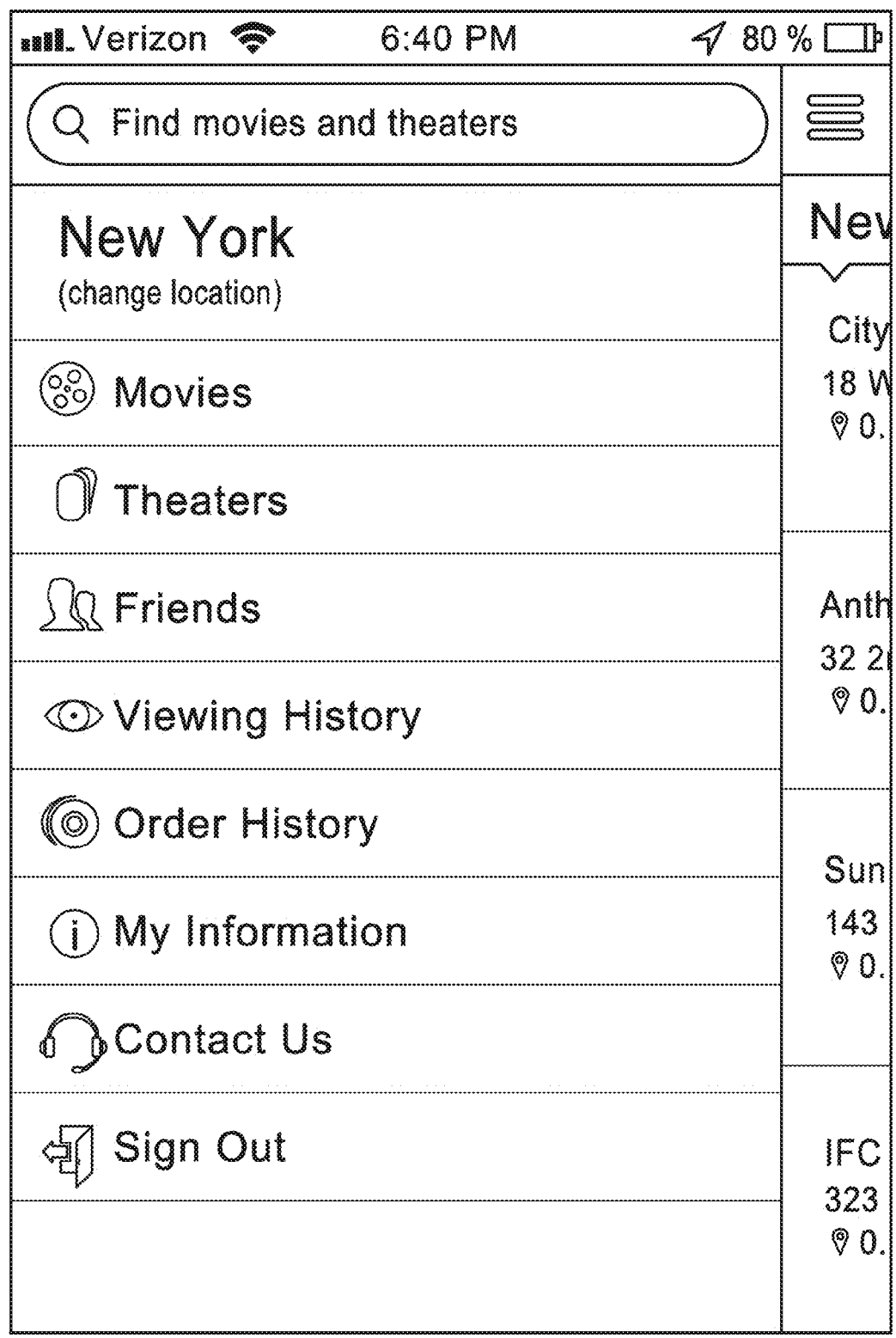

FIG. 41 is a screenshot of the navigation menu for the MoviePass™ mobile application. From the navigation menu the user can search for movies or theaters by typing into the search field on top. The user can also navigate to the different tabs and features of the MoviePass™ mobile application.

The movie theater business example followed herein is just one example of how data can be collected and used according to embodiments. Many other industries and government agencies could also benefit from the invention. Another example embodiment replaces government-issued food stamps with a reloadable card or E-wallet that can be controlled in the same way as described with reference to theater ticket sales. The user can only make purchases at food stores with certain MCCs. The user can also be restricted to purchases at food stores within a defined geographic area. This model is viable because more and more people have location-capable mobile devices regardless of economic strata, and it is desirable to prevent sale or misuse of food stamps or similar items of value issued to a particular person for a particular purpose. As in the examples already described, mobile device owners almost never give their devices to other people for hours at a time. So, it would be almost impossible for a food stamp recipient to sell or trade the value of the "virtual food stamp" to another person.

Other alternative embodiments are within the scope of the claimed invention. For example, in other embodiments, the MoviePass™ service communicates directly with theaters via theater APIs to obtain movie showing information for display to the user. In an embodiment, the user can reserve a ticket from the MoviePass™ mobile interface, instead of the previously described booking, which does not reserve a ticket. In various embodiments, mobile wallet or mobile pay methods and technologies are used instead of a prepaid credit card as previously described. For such embodiments, a theater must have the capability to accept payments from a user's mobile device.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A ticketing system comprising:
   a plurality of databases coupled via a network;
   a plurality of processors coupled to the plurality of databases;
   a plurality of electronic scanning devices coupled via the network wherein each of the electronic scanning devices is associated with a venue; and
   at least one user device coupled to the processors and the databases via the network, wherein the at least one user device comprises at least one of a smart phone, a handheld mobile device with communication capability, and a personal computer;
   wherein the plurality of processors are configured to,
      via the network, register a subscriber-user for a subscription in exchange for a subscription fee, wherein the subscription comprises a predetermined number of events in a time period, wherein the subscriber-user is associated with the at least one user device;
      via the network, from the at least one user device, receive a subscriber-user request to book a ticket for an event;
      determine that the subscription is current;
      determine a venue and a time for the event;
      communicate with the venue to reserve the requested ticket booking;
      associate a pre-paid credit card with the subscriber-user, wherein the pre-paid credit card is associated with an account;
      automatically detect, in real time, a location of the at least one user device at the determined venue to determine that the subscriber-user is at the determined venue;
      immediately fund the account with sufficient funds to pay for the requested ticket only if the location of the at least one user device is detected at the determined venue;
      determine, a predetermined time after funding the account, whether the sufficient funds remain in the account;
      detect a physical location of a scanning device via the network when one of the plurality of scanning devices is used to scan the pre-paid credit card; and
      collect and store data related to the subscriber-user in the databases, wherein the data comprises names of events attended by the subscriber-user, venues of the events attended by the subscriber-user, types of events attended by the subscriber-user, times of day of attendance by the subscriber-user, and frequency of attendance by the subscriber-user, and wherein collecting data comprises automatically receiving the data via the network.

2. A computer-implemented method for targeted selling, comprising:
   a processor via a network registering a subscriber-user for a subscription in exchange for a subscription fee, wherein the subscription comprises a predetermined number of events in a time period, wherein the subscriber-user is associated with at least one communication device;
   the processor communicating with a financial institution to set up a subscriber-user account for funding ticket purchases;
   the processor receiving and storing subscriber-user data comprising a name, an age, a gender, a home address, an email address, a phone number, product preferences, and names of friends in a database coupled to the processor;
   the processor receiving a request from the at least one communication device of the subscriber-user to book a ticket for an event;
   the processor determining a time for the event and a venue for the event;
   the processor communicating via a network with a venue system to reserve a ticket for the event;
   the processor sending the subscriber-user a ticket token to the at least one communication device, wherein the ticket token is scannable from the at least one communication device at the venue to give the subscriber-user access to the event;

the processor automatically detecting, in real time, a location of the at least one communication device at the venue to determine that the subscriber-user is at the venue;

the processor immediately funding the subscriber-user account with sufficient funds to pay for the requested ticket only if the location of the at least one communication device is detected at the venue;

the processor determining, a predetermined time after funding the subscriber-user account, whether the sufficient funds remain in the subscriber-user account;

after the end of the event, the processor detecting whether the ticket token was redeemed, comprising determining via a network whether the subscriber-user account has been debited for a price of the ticket;

if the ticket token was redeemed, the processor collecting event data, including a time of the event, a type of the event, a name of the event, and a location of the venue, wherein collecting comprises collecting scanned electronic data from scanning the ticket token;

the processor associating the event data with the subscriber-user data; and the processor storing the event data in the database.

3. The method of claim 2, wherein detecting whether the ticket token was redeemed further comprises, if the ticket token was not redeemed, the processor allowing the subscriber-user to request to book another ticket for the same event.

4. The method of claim 2, further wherein detecting whether the ticket token was redeemed further comprises, if the ticket token was redeemed, the processor disallowing the subscriber-user to request to book another ticket for the same event.

5. The method of claim 2, further comprising:
the processor sending the subscriber-user an electronic message inviting the subscriber-user to associate via a social networking site to become a networked subscriber-user;

the processor providing a networked subscriber-user a facility to invite friends to an event via the social networking site;

the processor receiving a list of friends invited to the event by the networked subscriber-user;

the processor collecting friend data regarding invited friends of the subscriber-user, comprising which friends accepted invitations, and which friends are also subscriber-users;

the processor associating the friend data with the subscriber-user data;

the processor storing the friend data in the database.

6. The method of claim 5, further comprising the processor generating data reports from the subscriber-user data, the event data, and the friend data.

7. The method of claim 2, further comprising the processor allowing the subscriber-user to book a predetermined number of events over a predetermined time period for a fixed price.

8. The method of claim 7, further comprising the processor tracking a number of events booked in the time period and disallowing requests to book events over the predetermined number of events over the predetermined time period.

9. The method of claim 2, further comprising, after the event is scheduled to be over, the processor sending an electronic message to the subscriber-user with a request to review the event.

10. The method of claim 2, further comprising, after the event is scheduled to be over, the processor sending an electronic message to the subscriber-user with at least one offer to purchase items related to the event.

\* \* \* \* \*